(12) United States Patent　(10) Patent No.: US 8,019,227 B2
Iizuka　(45) Date of Patent: Sep. 13, 2011

(54) INFORMATION TRANSMITTING SYSTEM, INFORMATION DECODING APPARATUS, INFORMING METHOD AND RECORDING MEDIUM

(75) Inventor: Nobuo Iizuka, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 280 days.

(21) Appl. No.: 12/472,670

(22) Filed: May 27, 2009

(65) Prior Publication Data

US 2009/0297158 A1　Dec. 3, 2009

(30) Foreign Application Priority Data

May 29, 2008　(JP) .................................. 2008-140704

(51) Int. Cl.
*H04B 10/02*　(2006.01)
*H04N 7/18*　(2006.01)
(52) U.S. Cl. ........ 398/140; 398/172; 398/168; 398/118; 382/103; 382/107
(58) Field of Classification Search ................ 398/172, 398/168, 118, 127, 130; 382/130, 137; 250/559.29, 250/559.31, 206.1, 206.2, 227.14
See application file for complete search history.

(56) References Cited

U.S. PATENT DOCUMENTS

| | | | | |
|---|---|---|---|---|
| 5,602,932 A | * | 2/1997 | Macdonald et al. | 382/100 |
| 5,793,880 A | * | 8/1998 | Constant | 382/100 |
| 6,603,865 B1 | * | 8/2003 | Yagi et al. | 382/103 |
| 7,415,212 B2 | * | 8/2008 | Matsushita et al. | 398/140 |
| 2003/0025803 A1 | * | 2/2003 | Nakamura et al. | 348/218.1 |
| 2003/0058262 A1 | * | 3/2003 | Sato et al. | 345/690 |
| 2004/0201717 A1 | * | 10/2004 | Matsushima | 348/222.1 |
| 2008/0298812 A1 | * | 12/2008 | Nagatomo et al. | 398/173 |
| 2009/0052902 A1 | * | 2/2009 | Shinokura | 398/118 |
| 2010/0146454 A1 | * | 6/2010 | Sugahara et al. | 715/859 |

FOREIGN PATENT DOCUMENTS

| | | |
|---|---|---|
| JP | 2001-244948 A | 9/2001 |
| JP | 2001-245253 A | 9/2001 |
| JP | 2003-179556 A | 6/2003 |

(Continued)

OTHER PUBLICATIONS

Japanese Office Action dated Mar. 9, 2010 and English translation thereof in counterpart Japanese Application No. 2008-140704.

(Continued)

*Primary Examiner* — Ken N Vanderpuye
*Assistant Examiner* — Tanya Ngo
(74) *Attorney, Agent, or Firm* — Holtz, Holtz, Goodman & Chick, PC

(57) ABSTRACT

A digital camera 800 receives from lighting units 120a-120l lights temporarily changing in luminance and produces a coordinates data list 8031 of the lighting units. Decoding unit 804 reads change in luminance at each luminance-point coordinates of the lighting unit to decode information. It is judged based on the decoded information of a data format 900, whether plural luminance-point coordinates having the same guidance point ID information 902 are found. When the plural luminance-point coordinates having the same guidance point ID information are found, a location of the plural luminance-point coordinates is analyzed to draw and display a circumscribed polygon having its vertices at these coordinates on a through image in an overlapping manner. A hatched area is set inside the circumscribed polygon and the decoded information is displayed within the hatched area.

8 Claims, 16 Drawing Sheets

FOREIGN PATENT DOCUMENTS

| | | |
|---|---|---|
| JP | 2003-323239 A | 11/2003 |
| JP | 2004-056343 A | 2/2004 |
| JP | 2005-106648 A | 4/2005 |
| JP | 2005-198059 A | 7/2005 |
| JP | 2008-085555 A | 4/2008 |
| WO | WO 03/036829 A1 | 5/2003 |
| WO | WO 2003/036829 A1 | 5/2003 |

OTHER PUBLICATIONS

Matsushita, Nobuyuki, et al., ID Cam: An image sensor that can capture a scene and an ID at the same time: (ISEC2001-130); Technical research report of the Institute of Electronics, Information and Telecommunications Engineers, Japan; Institute of Electronics, Information and Telecommunications Engineers, Mar. 12, 2002, vol. 101, No. 728, pp. 105-110.

Nobuyuki Matsushita et al, International Publication Pamphlet No. 2003/036829,"ID Cam: An image sensor that can capture a scene and an ID at the same time" (ISEC2001-130), Technical research report of the Institute of Electronics, Information and Telecommunications Engineers, Japan, Issued by the Institute of Electronics, Information and Telecommunications Engineers, Mar. 12, 2002, vol. 101, No. 728, pp. 105-110, ISSN: 0913-5685.

* cited by examiner

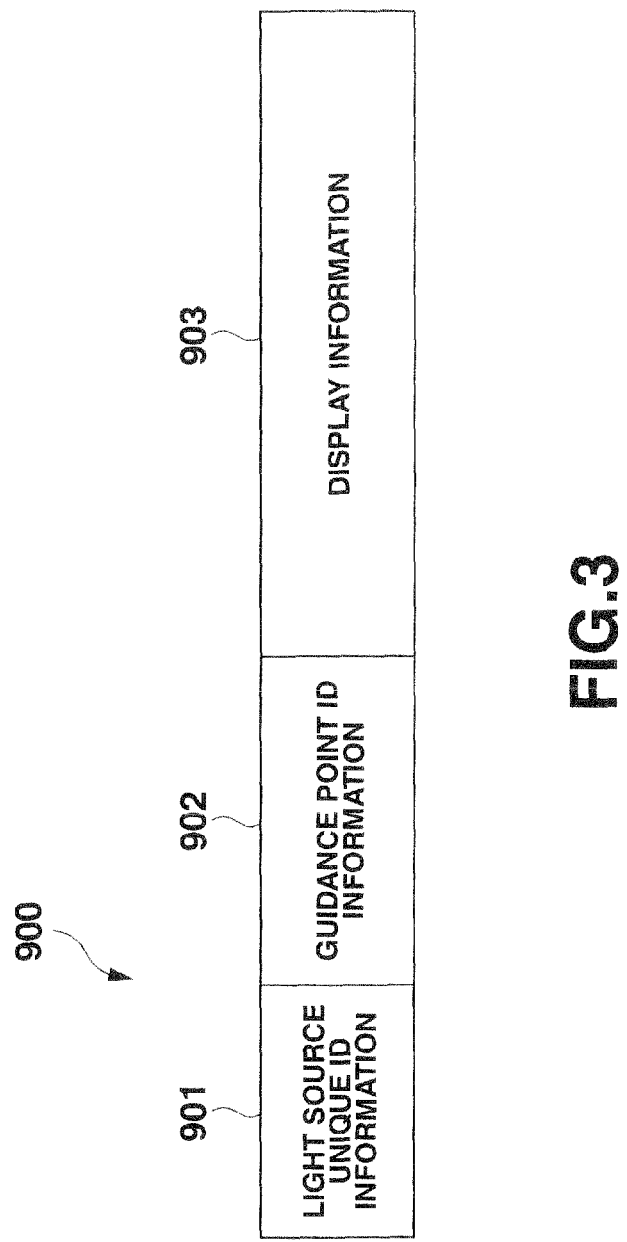

FIG.8A

| LIGHT SOURCE UNIQUE ID INFORMATION | GUIDANCE POINT ID INFORMATION | BOUNDARY LINE FLAG | BOUNDARY POINT NUMBER INFORMATION | TOTAL BOUNDARY NUMBER INFORMATION | DISPLAY INFORMATION 1 | DISPLAY INFORMATION 2 |
|---|---|---|---|---|---|---|
| 911 | 912 | 913 | 914 | 915 | 916 | 917 |

| LIGHT SOURCE OF INFORMATION | LIGHT SOURCE UNIQUE ID INFORMATION | GUIDANCE POINT ID INFORMATION | BOUNDARY LINE FLAG | BOUNDARY POINT NUMBER INFORMATION | TOTAL BOUNDARY NUMBER INFORMATION | DISPLAY INFORMATION 1 | DISPLAY INFORMATION 2 |
|---|---|---|---|---|---|---|---|
| 121m | 01 | 123 | 1 | 1 | 6 | PARK ×× | VICINITY OF CROSSING ○○ |
| 121n | 02 | | 1 | 2 | | | NORTH ENTRANCE |
| 121o | 03 | | 1 | 3 | | | VICINITY OF CROSSING ×× |
| 121p | 04 | | 1 | 6 | | | CENTRAL ENTRANCE |
| 121q | 05 | | 0 | 0 | | | FOUNTAIN |
| 121r | 06 | | 0 | 0 | | | |
| 121s | 07 | | 1 | 5 | | | STAGE |
| 121t | 08 | | 1 | 4 | | | A STREET ENTRANCE |
| | | | | | | | SOUTH ENTRANCE |

# INFORMATION TRANSMITTING SYSTEM, INFORMATION DECODING APPARATUS, INFORMING METHOD AND RECORDING MEDIUM

BACKGROUND OF THE INVENTION

1. Field of the Invention

The present invention relates to an information transmitting system, an information decoding apparatus, an informing method and a recording medium, which transmit and receive information, using a light as a transmission medium.

2. Description of the Related Art

An information transmitting system using a conventional visible-light communication technology has been developed. For instance, Japanese Patent 2003-179556 A discloses a system, which uses a digital camera as an information decoding apparatus to successively shoot lighting units within an image pick-up angle and decodes information from luminance flashes of luminance points of the lighting units, thereby displaying information and figures such as word balloons.

But in the case where there are plural luminance points based on the same information within the image pick-up angle, since appropriate information and figures such as word balloons are displayed at respective luminance points, an information provider in the system cannot provide a terminal of an information receiver with the same information through screen display.

SUMMARY OF THE INVENTION

The present invention has been made to overcome the above disadvantage, and has an object to provide a technique for giving information rich in expression.

According to one aspect of the invention, there is provided an information transmitting system, which comprises a light emitting apparatus for emitting a light and temporarily modulating the light in accordance with information, thereby transmitting the light changing in luminance, and an information decoding apparatus for continuously receiving the light changing in luminance from the light emitting apparatus to decode the information from the received light, wherein the information decoding apparatus comprises a light receiving unit having plural light receiving elements regularly disposed in a two dimensional array, for receiving a light, a storing unit for storing plural sets of decoded information by the information decoding unit and a light receiving position in the light receiving unit associated with said decoded information, wherein at the light receiving position the light temporarily changing in luminance is received from the light emitting apparatus, a judging unit for judging whether or not common information is included in each piece of information stored in the storing unit, and an informing unit for, when the judging unit determines that the common information is included in plural pieces of information, informing the light receiving positions that are associated with said plural pieces of information in a distinguishable manner from other light receiving positions.

According to another aspect of the invention, there is provided an information decoding apparatus, which comprises a light receiving unit having plural light receiving elements regularly disposed in a two dimensional array, for receiving a light temporarily changing in luminance, an information decoding unit for decoding information from the light received by the light receiving unit, a storing unit for storing plural sets of the decoded information by the information decoding unit and a light receiving position in the light receiving unit associated with the decoded information, at which light receiving position the light is received, a judging unit for judging whether or not common information is included in each piece of information stored in the storing unit, and an informing unit for, when the judging unit determines that the common information is included in plural pieces of information, informing plural light receiving positions that are associated with said plural pieces of information in a distinguishable manner from other light receiving positions.

According to other aspect of the invention, there is provided an informing method used in a system including a light receiving unit having plural light receiving elements regularly disposed in a two dimensional array, for receiving a light changing in luminance and a storing unit for storing data, which method comprises decoding information from the light changing in luminance, received by the light receiving unit, storing in the storing unit plural sets of the decoded information and a position of a light receiving element of the light receiving unit associated with the decoded information, with which light receiving element the light receiving unit receives the light, judging whether or not common information is included in each piece of information stored in the storing unit, and informing, when it is determined that the common information is included in plural pieces of information stored in the storing unit, the positions of the plural light receiving elements that are associated with said plural pieces of information in a distinguishable manner from positions of other light receiving elements.

According to still other aspect of the invention, there is provided a computer readable recording medium storing a computer program that is executable by a computer to cause the computer to perform an information informing procedure, wherein the computer is installed in a system including a light receiving unit having plural light receiving elements regularly disposed in a two dimensional array, for receiving a light temporarily changing in luminance and a storing unit for storing data, said computer program causing the computer to function as units, which comprise an information decoding unit for decoding information from the light changing in luminance, received by the light receiving unit, a storage controlling unit for storing in the storing unit plural sets of the decoded information by the information decoding unit and a light receiving position or the light receiving unit associated with the decoded information, at which light receiving position the light is received, a judging unit for judging whether or not common information is included in each piece of information stored in the storing unit, and an informing unit for, when the judging unit determines that the common information is included in the plural pieces of information stored in the storing unit, informing plural light receiving positions that are associated with said plural pieces of information in a distinguishable manner from other light receiving positions.

BRIEF DESCRIPTION OF THE DRAWINGS

FIG. 3 is a view showing a data format of information to be transmitted from lighting units.

FIG. 8A is a view showing a data format of information transmitted from lighting units.

FIG. 8B is a view showing contents of the information transmitted from the lighting units.

DETAILED DESCRIPTION OF THE PREFERRED EMBODIMENTS

First Embodiment

Now, the first embodiment of the present invention will be described in detail with reference to the accompanying drawings. In the following description, various specified details, examples, numerals, character strings and other symbols are given only for reference to help clear understanding of the concept of the present invention, and it should be understood that part, or whole of the above references by no means restrict the concept of the invention. Well-known method, procedure, architecture, and circuit configuration (hereinafter, "well-known matters") are not described in detail only for sake of simplicity, which is not intended to exclude part or whole of the well-known matters. These well-known matters were known to a person skilled in the art at the time when the present invention was made, and therefore it is a matter of course that these well-known matters are included in the following description.

Figure 1:
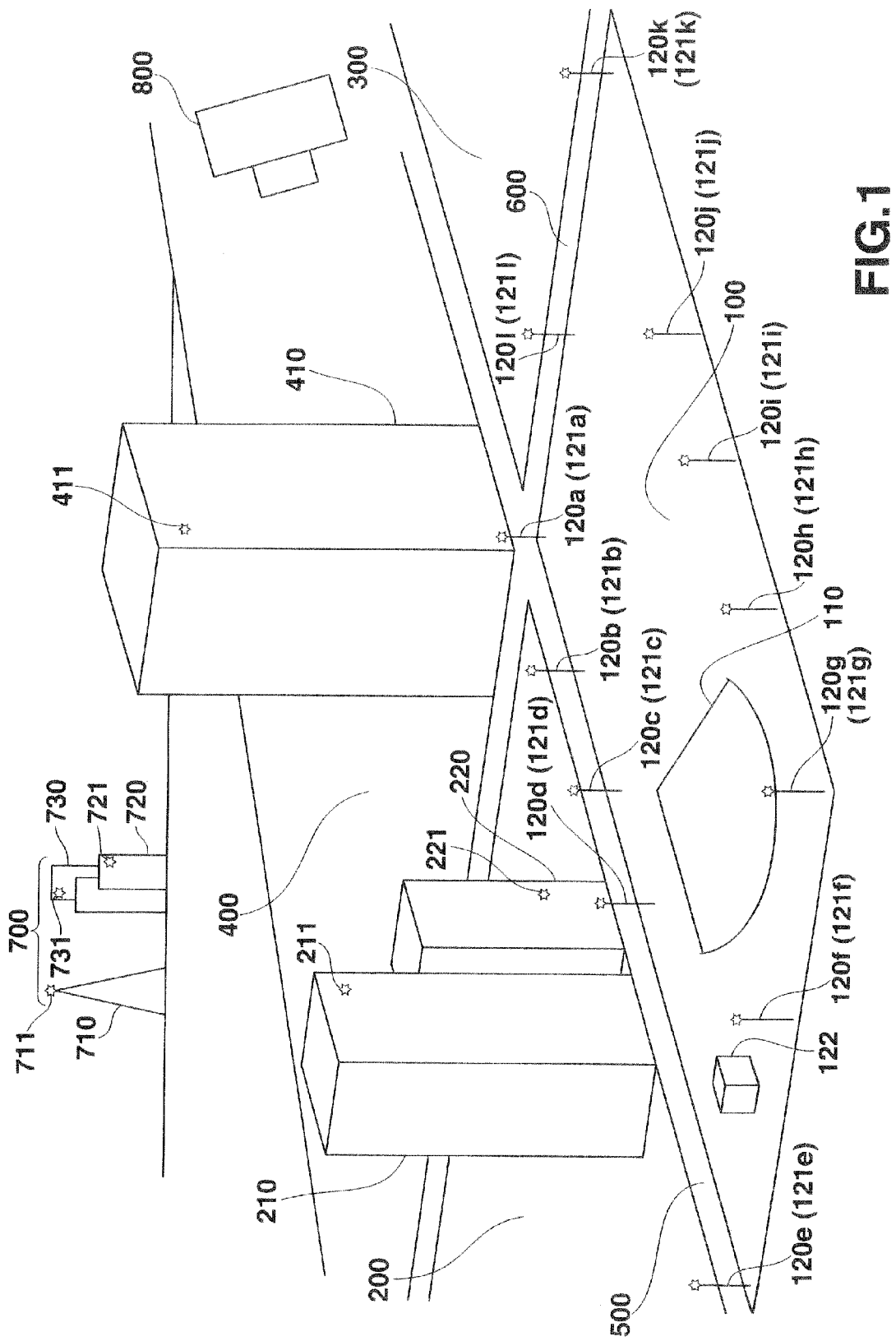
FIG. 1 is a view illustrating a scenery of a city, where the embodiment of the invention is used.

FIG. 1 is a view briefly illustrating a scenery of a city, where the embodiment of the invention is used. As shown in FIG. 1, the city is roughly partitioned off into four blocks 100, 200, 300 and 400 by streets 500 and 600. There is a park including a baseball stadium 110 in the block 100. In the block 200 there are two buildings 210 and 220. Further, there is a building 410 in the block 400. A tower like structure 710 and two buildings 710 and 730 can be seen in the distance 700.

In the block 100, street lights 120a-120l with lighting units 121a-121l are set up around the park and equipment 122 is built, which controls light emitting of the lighting units 121a-121l. The buildings 210, 220, 410, 720 and 730 are equipped with lighting units 211, 222, 411, 721 and 731, respectively. The tower like structure 710 is also equipped with a lighting unit 711. A digital camera 800 or an information decoding apparatus is provided as shown in FIG. 1. The present embodiment of the invention will be described, where an operator of the digital camera 800 takes a comprehensive, panoramic view of the city.

The lighting units 121a-121l, 211, 221, 411, 711, 721 and 731 are used for an illumination purpose and for an awareness of position by a flying vehicle. Further, these lighting units are used as information transmitting equipment in a visible light communication system, light emitting of which is temporally controlled to change in luminance, as described in detail in Japanese Patent 2003-179556 A.

Figure 2A:
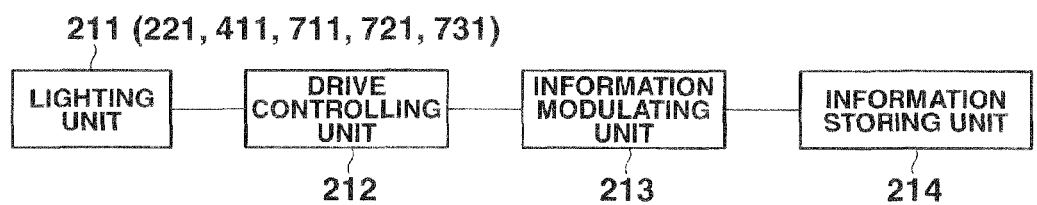
FIG. 2A is a view snowing functions of lighting equipment.

FIG. 2A is a view showing functions of lighting equipment including the lighting units 211, 221, 411, 711, 721 and 731. As shown in FIG. 2A, the lighting equipment comprises the lighting units 211, 221, 411, 711, 721 and 731, a drive controlling unit 212, an information modulating unit 213 and an information storing unit 214.

The lighting units 211, 221, 411, 711, 721 and 731 each have light emitting devices such as LED. The information storing unit 214 stores information to be transmitted to the information decoding unit. The information storing unit 214 stores digital data of information to be displayed (display information), wherein the display information includes commercial items such as a name if building, floor number, on which the lighting unit (211, 221, 411, 711, 721 and 731) is mounted, floor information, and an event which is held on the floor or in the building. The information modulating unit 213 comprises a circuit for decoding and/or modulating the digital data stored in the information storing unit 214 into information temporally changing in luminance. For encoding and/or modulating the digital data, any encoding method modulating method may be used but it is preferable to employ 4 False Position Modulation (4PPM) using a sub-carrier wave of 28.8 kHz.

The drive controlling unit 212 comprises circuits which are connected to the lighting units 211, 221, 411, 711, 721 and 731 to drive them in accordance with the data modulated by the information modulating the 213, whereby the lighting units are temporally controlled to change in luminance at a frequency, at which data can be transmitted in the normalized visible light communication system. The circuits connected to the lighting units 211, 221, 411, 711, 721 and 731 are provided within the buildings 210, 220, 410, 720 and 730 and the tower like structure 710.

Figure 2B:
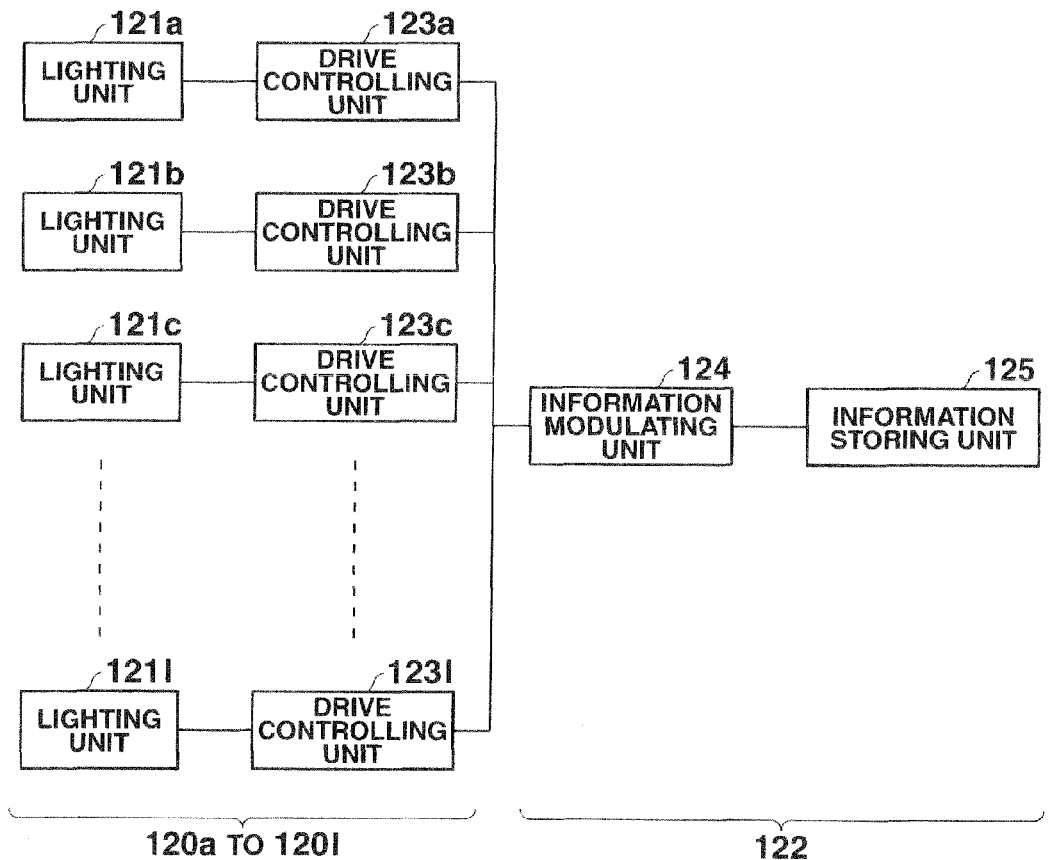
FIG. 2B is a view showing functions of the lighting equipment.

FIG. 2B is a view snowing functions of the lighting equipment including the lighting units 121a-121l. As shown in FIG. 2B, the lighting equipment comprises the lighting units 121a-121l, drive controlling units 123a-123l, an information modulating unit 124 and an information storing unit 125.

The lighting units 121a-121l each have has light emitting devices such as LED. The information storing unit 125 stores information to be transmitted to the information decoding unit. As shown in FIG. 3, the information to be stored in the information storing unit 125 comprises plural pieces of light source unique ID information 901, guidance point ID information 902 and display information 903, wherein the plural pieces of light source unique ID information 901 are separately set to the lighting units 121a-121l and the guidance point ID information 902 is commonly set to the lighting units 121a-121l. The display information 903 is digital data including commercial items such as a name of facilities (in the present embodiment, a "park") in the block surrounded by the street, lights 120a-120l provided with the lighting units 121a-121l and events put in the facilities.

The information modulating unit 124 comprises a circuit for encoding and/or modulating the digital data stored in the information storing unit 125 into information that temporally changes in luminance. For encoding and/or modulating the digital data, any encoding method and modulating method may be used but it is preferable to employ 4 Pulse Position Modulation (4PPM) using a sob-carrier wave of 28.8 kHz.

The drive controlling units 123a-123l comprise circuits that are connected to the lighting units 121a-121l to drive them in accordance with the data modulated by the information modulating unit 124, whereby the lighting units 121a-121l are controlled to temporally change in luminance at a frequency, at which data can be transmitted in the normalized visible light communication system. In the lighting equipment, the street lights 120a-121l are provided with the lighting units 121a-121l and drive controlling units 123a-123l, respectively. The equipment 122 is provided with the information modulating unit 124 and the information storing unit 125. The street lights 120a-120l are connected to the equipment 122 through a transmitting cable buried in the block 100. The equipment 122 centrally controls illumination adjusting operation of the lighting units 121a-121l, modulating operation, and synchronization of light emitting operation for an information transmitting purpose.

Even if an ad-hoc event should be put on in the block 100, information to be transmitted from the lighting units 121a-121l can be controlled only by rewriting information to be set in the information storing unit 125, and therefore management of the information to be transmitted can be made in a simple manner.

The information to be store in the information storing unit 125 is shown in FIG. 3, and a data format 900 of the information to be transmitted from the lighting emits 121a-121l is also shown in FIG. 3. The lighting units 121a-121l temporally change their luminance, thereby transmitting contents of data in the data format 900 to many unspecified receivers it a circular fashion.

Figure 4:
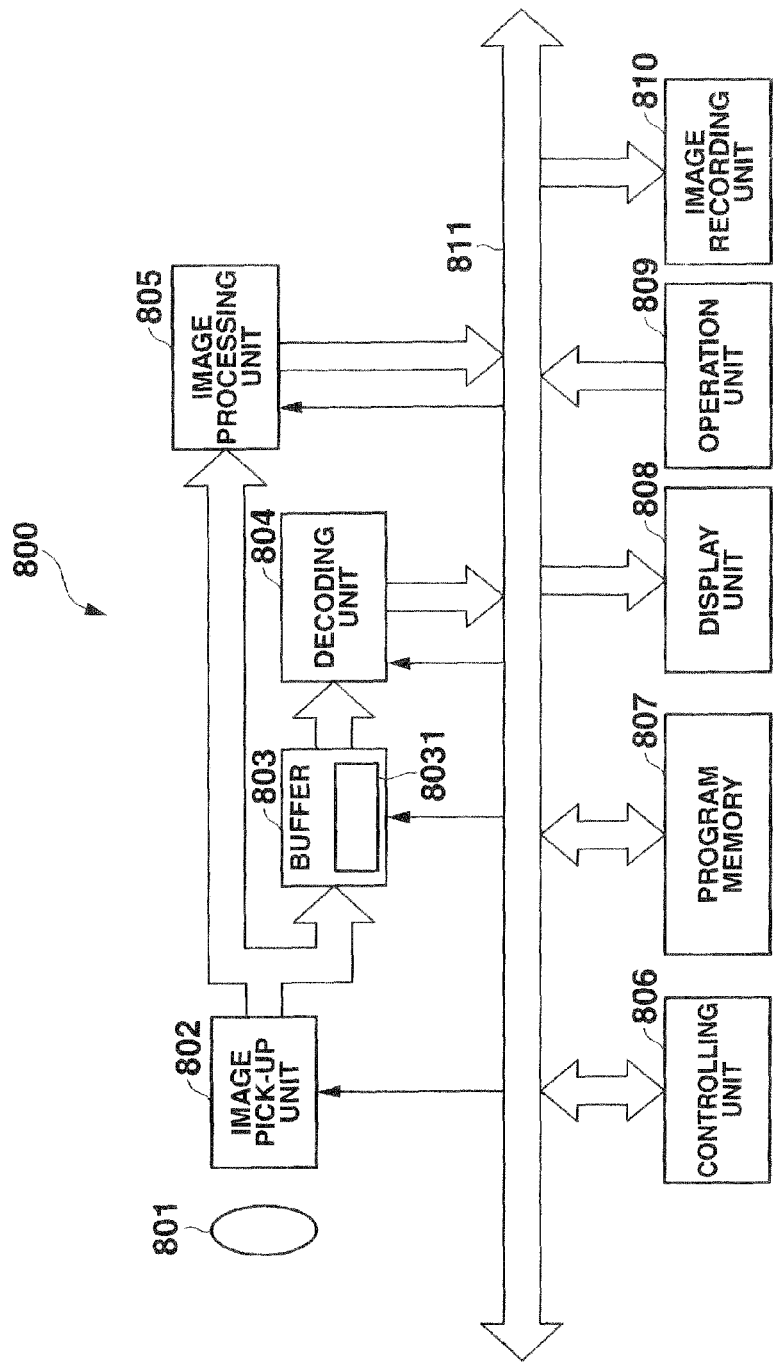
FIG. 4 is a view showing a circuit, configuration of a digital camera.

FIG. 4 is a view illustrating a circuit, configuration of the digital camera 800. As shown in FIG. 4, the digital camera 800 comprises a lens system 801, image pick-up unit 802, buffer 803, decoding unit 804, image processing unit 805, controlling unit 806, program memory 807, display unit 808, operation unit 809 and image recording unit 810, aid of which are connected to each other through a data bus 811.

The lens system 801 includes a zoom lens and a focus lens. Upon receipt or a control, signal generated based on a zoom control operation of the operation unit 809 and a control signal generated based on a focusing operation of the controlling unit 806, the lens system 800 adjusts an Image pick-up angle and an optical image of the image pick-up unit 802.

The image pick-up unit 802 comprises an image pick-up device such as CCD and CMOS, which has plural light receiving elements regularly disposed in a two dimensional array. The image pick-up unit 802 picks up an incident optical image through the lens system 801 at an image pick-up angle (predetermined image pick-up area) adjusted based on a control signal sent from the controlling unit 806, and converts the picked up optical image (image within the predetermined image pick-up area) into digital data, outputting the same digital data to the image processing unit 805. Further, in a shooting mode to be described later in detail, the image pick-up unit 802 continuously picks up images at an image pick-up angle (or within a predetermined image pick-up area defined by the image pick-up angle) and supplies to the image processing unit 805 the picked up images as continuous image frames, thereby displaying a through image on the display unit 808 and successively output ting the image frames to the buffer 803.

The buffer 803 has a coordinates data list 8031. In accordance with the control signal sent from the controlling unit 806, the buffer 803 temporarily stores a predetermined number of image frames supplied from the image pick-up unit 802. In other words, the buffer 803 temporarily stores at least the predetermined number of image frames which correspond to information in the data format 900 transmitted to give notice of changes in luminance. In the case lights ate received from the lighting units 121a-121l, 211, 221, 411, 711, 721 and 731, and a "luminance" is found in each of the predetermined number of image frames, light, receiving positions where the "luminance" is found in the image pick-up area defined by the image pick-up angle are defined as "luminance-point coordinates" (in other words, the "luminance-point coordinates" correspond to the center of an area, where such "luminance" is found in the image pick-up area). The luminance-point coordinates and temporal change in luminance at the luminance-point coordinates caused between the predetermined number of image frames are stored and renewed in the coordinates data list 8031, wherein such temporal change in luminance is expressed in a bit data string including, for example, "1" (turned on) and "0" (turned off).

The decoding unit 804 serves to decode the change in luminance stored in the coordinates data list 8031 into digital data (digital information) based on the control signal sent, from the controlling unit 806.

The image processing unit 805 operates in accordance with the control signal sent from the controlling unit 806 and adjusts image quality and image size of the image frames (digital data) output from the image pick-up unit 802 to display on the display unit 808 as a through image. Further, upon receipt of the control signal of instructing a recording operation from the controlling unit 806, the image processing unit 805 encodes an optical image within the image pick-up area that, is picked up by the image pick-up unit 802 at the time when such instruction of recording operation is given, obtaining image data in JPEG format as an image file.

The controlling unit 806 serves to run the program stored in the program memory 807, thereby controlling whole operation of the digital camera 800.

The program memory 807 stores a program of operation of the digital camera 800 in the present embodiment. For instance, when an operation of the operation unit 809 is detected to turn on the power, the controlling unit 806 reads and loads the program from the program, memory 807 to perform various processes.

The display unit 808 comprises a display device such as a liquid crystal display device and a driver for driving the display device. The display unit 808 displays a through image sent from the image processing unit 805, and further displays information decoded by the decoding unit 804 in association with luminance-point coordinates of the light ting units from which the information is transmitted, on the through image in an over lapping manner, thereby giving a notice.

The operation unit 809 is provided with a shatter key for giving a recording instruction and a zoom key for operating the zoom lens in the lens system 801.

The image recording unit 810 stores the image file of the optical image produced by the image processing unit 805 and the information decoded by the decoding unit 804.

Now, the processes performed by the controlling unit 806 of the digital camera 800 will be described with reference to a flow chart shown in FIG. 5.

When the digital camera 800 has been set to the shooting mode, the controlling unit 806 makes the image pick-up unit 802 continuously shoot an object within the image pick-up angle and output the shot images (picked up images) of the object to the image processing unit 805 as continuous image frames. Further, the controlling unit 806 displays on the display unit 808 the continuous image frames as a through image. Meanwhile, the controlling unit 806 accumulates the image frames in the buffer 803 (step S1).

When an operation of accumulating the image frames in the buffer 803 starts at step S1, it is judged at step S2 whether or not a predetermined number of image frames have been accumulated in the buffer 803. That is, it is judged whether or not the predetermined number of image frames nave been accumulated in the buffer 803, which image frames correspond to the information to be transmitted in the data format 900, indicating chance in luminance. When it is determined at step S2 that the predetermined number of image frames have been accumulated in the buffer 803 (YES at step S2), the operation advances to step S3. When it is determined at step S2 that the predetermined number of image frames have not yet been accumulated in the buffer 803 (NO at step S2), the operation returns to step S1.

When it is determined at step S2 that the predetermined number of image frames have been accumulated in the buffer 803 (YES at step S2), a coordinates data list 8031 is produced at step S3. In other words, "luminance-point coordinates" of lights from the lighting units 121a-121l, 211, 221, 411, 711, 721 and 731 are calculated in each of the predetermined number of image frames, and further temporal change in luminance at each of the calculated luminance-point coordinates caused between the predetermined number of image frames is acquired and expressed in a bit data string including "1" (turned on) and "0" (turned off). The bit data strings are associated with the luminance-point coordinates respectively and stored in the coordinates data list 8031.

When the coordinates data list 8031 has been produced at step S3, the temporal change in luminance at each of the luminance-point coordinates is read out from the coordinates data list 8031 to the decoding unit 804 to be decoded into information at step S4. Then, it is judged at step S5 whether or not plural luminance-point coordinates transmitted in the data format 900 (shown in FIG. 3) and having the same guidance point ID information 902 have been found in the decoded information.

When it is determined an step S5 that plural luminance-point coordinates having the same guidance point ID information 902 have been found in the decoded information (YES at stop S5), a location of these luminance-point coordinates having the same guidance point ID information 902 is analyzed at step S6, and a circumscribed polygon having vertices at the luminance-point coordinates is drawn and displayed in the through image displayed on the display unit 808 in an overlapping manner at step S7. Then, an inside of the drawn circumscribed polygon is subjected to a hatching process with a special half-translucent color at step S8. The decoded information is adjusted to be displayed at the center of the hatched area in an overlapping manner at step S9.

Meanwhile, when it is determined at step S5 that plural luminance-point coordinates having the same guidance point ID information 902 have not been, found in the decoded information (NO at step S5), it is determined that independent information has been transmitted from the lighting units corresponding to the luminance-point coordinates and the independent information is combined with a word balloon. The word balloon combined with the information is adjusted to be displayed on the luminance-point coordinates in the through image output from the image processing unit 805 at step S10.

After the displaying processes have been performed at steps S9 and S10, it is judged at step S11 whether or not an operation has been performed on the operation unit 809 to terminate the shooting operation. When it is determined at step S11 that the operation has been performed to terminate the shooting operation (YES at step S11), the shooting mode is terminated. Meanwhile, it is determined at step S11 that the operation has not been performed to terminate the shooting operation (NO at step S11), then the operation returns to step S1.

Figure 5:
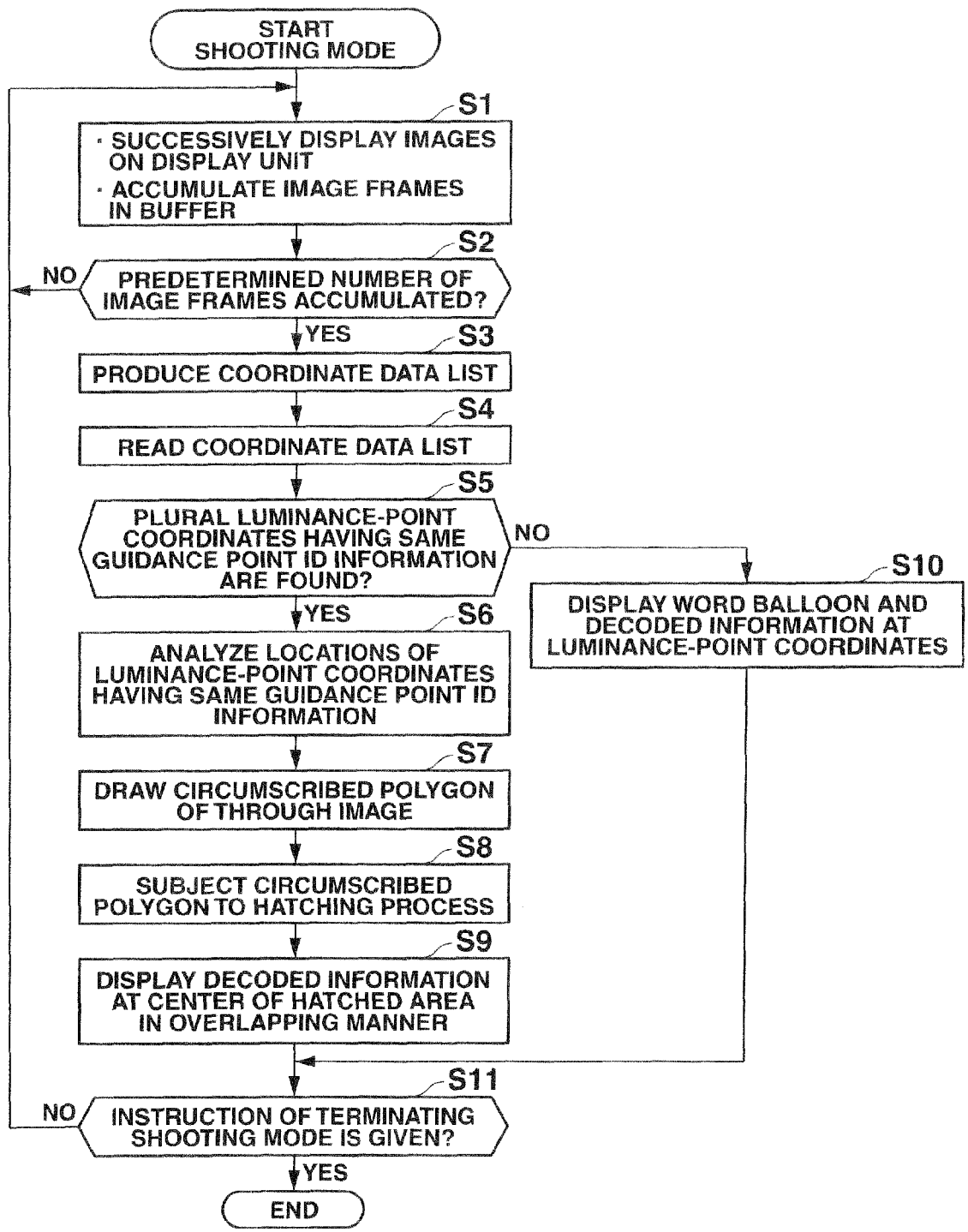
FIG. 5 is a flow chart of a shooting operation performed in the digital camera.
Figure 6:
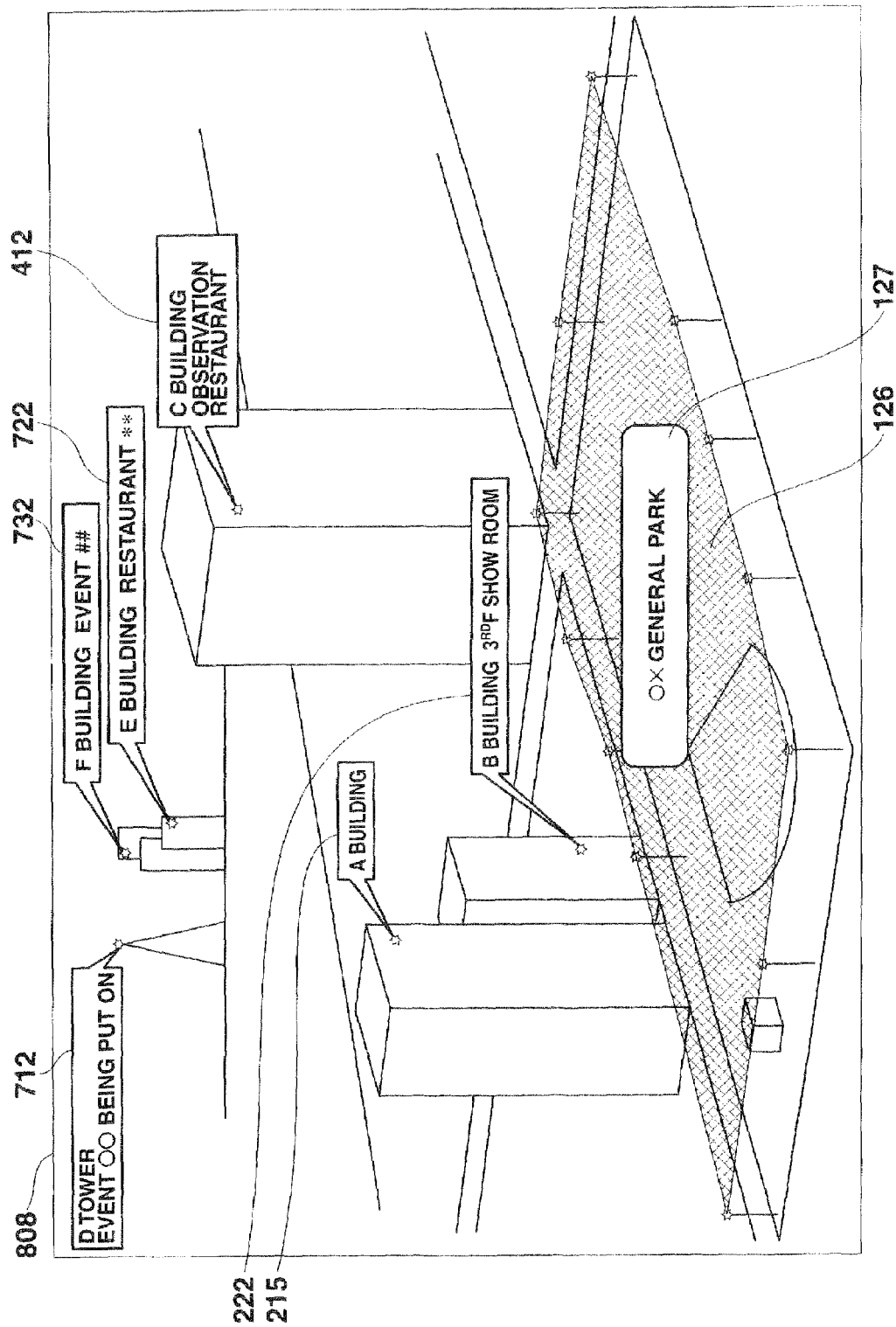
FIG. 6 is an overhead view of a city displayed on a display unit.

FIG. 6 is a view illustrating the image which is displayed on the display unit 808 in the process performed at step S9 in the flow chart of FIG. 5. FIG. 6 is an overhead view of the city displayed on the display unit 808. In FIG. 6, the luminance-point coordinates of the lighting unit 211 (FIG. 1) in the image pick-up area is combined with a word balloon 215. In the word balloon 215 is included decoded information ("A Building") indicating a name of the building that is provided with the lighting unit 211. The word balloon 215 combined with the information of "A Building" is displayed on the through image in an overlapping manner as shown in FIG. 6. Further, the luminance-point coordinates of the lighting unit 221 (FIG. 1) in the image pick-up area is combined with a word balloon 222. In the word balloon 222 is included decoded information ("B Building, Show Room on $3^{rd}$ F") indicating a name of the building that is provided with the lighting unit 221 and a floor number. The word balloon 222 combined with the information of "B Building, Show Room on $3^{rd}$ F" is displayed on the through image in an overlapping manner as shown in FIG. 6. Furthermore, the luminance-point coordinates of the lighting unit 411 (FIG. 1) in the image pick-up area is combined with a word balloon 412. In the word balloon 412 is included decoded information ("C Building, Observation Restaurant") indicating a name of the building that is provided with the lighting unit, 411 and a tenant. The word balloon 412 with the information of "C Building, Observation Restaurant" is displayed on the through image in an overlapping manner as shown in FIG. 6.

The luminance-point coordinates of the lighting unit 711 (FIG. 1) in the image pick-up area is combined with a word balloon 712. In the word, balloon 712 is included decoded information ("D tower and Event D being put on") indicating a name of the structure provided with the lighting unit 711 and an event. The word balloon 712 combined with, the information of "D tower and Event OO being put on" is displayed on the through image in an overlapping manner as shown in FIG. 6. Further, the luminance-point coordinates of the lighting unit 721 (FIG. 1) in the image pick-up area is combined with a word balloon 722. In the word balloon 722 is included decoded information ("E Building, Restaurant ") indicating a name of the building that is provided with the lighting unit 721 and a tenant. The word balloon 722 combined with the information of "E Building, Restaurant " is displayed on the through image in an overlapping manner as shown in FIG. 6. Furthermore, the luminance-point coordinates of the lighting unit 731 (FIG. 1) in the image pick-up area is combined with a word balloon 735. In the wore balloon 732 is included decoded information ("F Building, Event FF") indicating a name of the building that is provided with the lighting unit 731 and an event. The word balloon 732 combined with the information of "F Building, Event ##" is displayed on the through image in an overlapping manner as shown in FIG. 6.

Meanwhile, since common guidance point ID information is set in the information corresponding to plural luminance-point coordinates of the lighting units 121a-121l (FIG. 1) in the image pick-up area, a circumscribed polygon 126 having vertices at these luminance-point coordinates is drawn and an inside of the circumscribed polygon 126 is subjected to a hatching process with a special half-translucent color. At the center of the hatched portion, display information 127 ("OX General Park") in the decoded information 903 indicating a name of facility constructed in the block 100 is combined with the hatched portion and displayed on the through image in an overlapping manner. Contents of information produced in response to temporal changes in luminance of the lighting units 121c-121l are provided on a hatched plane and can be distinguished from contents provided in response to temporal changes in luminance of the lighting units 211, 221, 411, 711, 721 and 731. Therefore, a single piece of information can be displayed to an information decoding apparatus by means of a plane and information rich in expression can be provided in the first embodiment.

Second Embodiment

In the first embodiment, when all the lighting units 121a-121l are included within the image pick-up area, information can be displayed on a plane. In practice, when the digital camera 800 is operated by the user, such disadvantage can be invited that all the lighting units 121a-121l are not included in the image pick-up angle due to optical zooming operation, camera angle, obstacles laying between the lighting unit(s) and the camera.

In the second embodiment, an improvement to solve the above disadvantage will be described in detail. In the second embodiment, like reference numerals represent like elements of the first embodiment and a further description hereof will be omitted.

Figure 7:
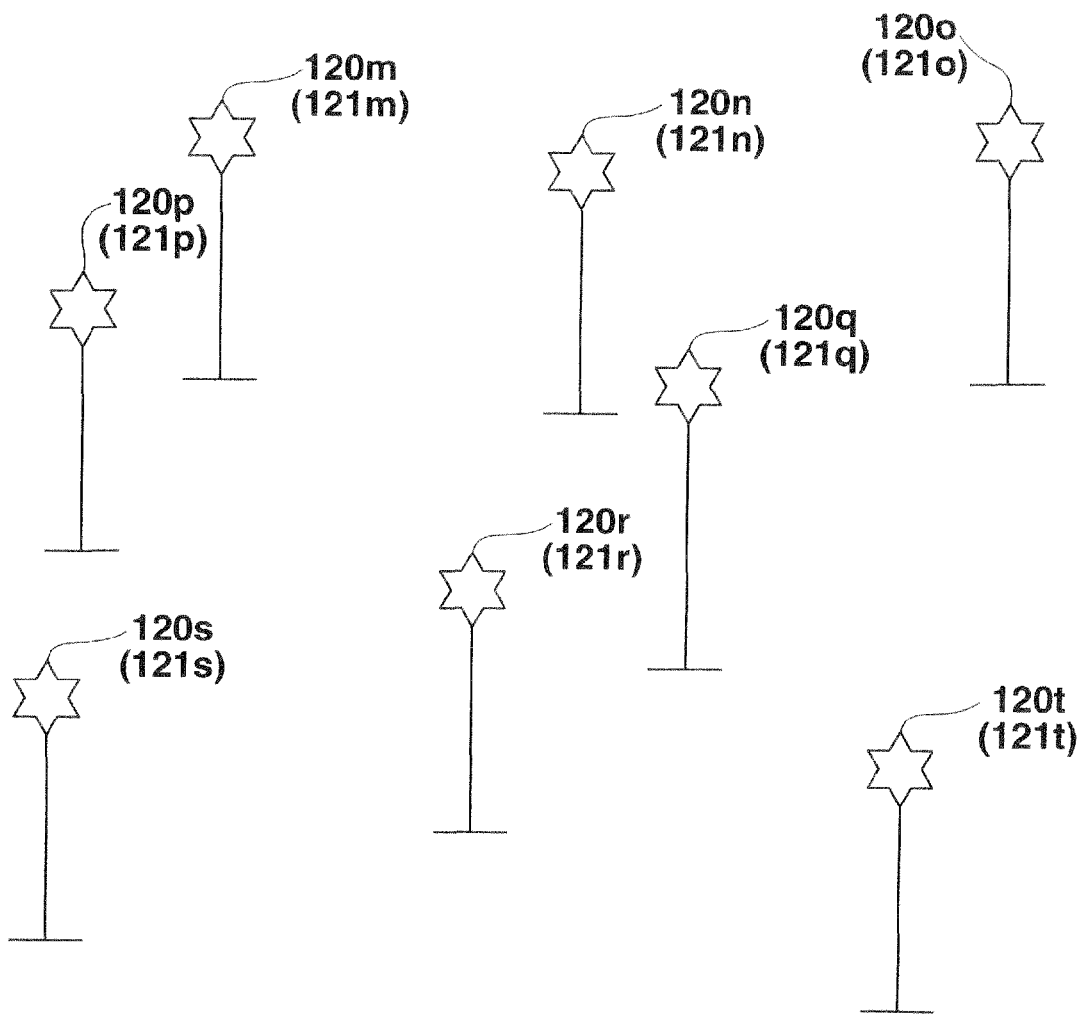
FIG. 7 is a view illustrating a location of street lights (lighting units) in the second embodiment of the invention.

FIG. 7 is a view illustrating locations of street lights (lighting units) in the second embodiment. The street lights 120m-120t with lighting units 121m-121t are set up in a special area. The street lights 120m-120t are connected to the equipment 122 in the same manner as in the first embodiment. The equipment 122 centrally controls illumination adjusting operation of the lighting units 121m-121t, modulating operation, and synchronization of light emitting operation for an information transmitting purpose.

FIG. 8A is a view illustrating a data format 910 of data transmitted from the lighting units 121m-121t. The data format 910 includes light source unique ID information 911, guidance point ID information 912, "display information 1" 916, "display information 2" 917, and further a boundary line flag 913, boundary point number information 914, and total boundary number information 915. The light source unique ID information 911, guidance point ID information 912, and "display information 1" 916 correspond to the eight source unique ID information 901, guidance point ID information 902, and "display information 903 in the first embodiment, respectively.

FIG. 8B is a view showing contents of information transmitted from the lighting units 121m-121t, each of which temporarily changes in luminance. As shown in FIG. 8B, in the information to be transmitted from the fighting unit 121m, for example, a value of "01" is set to the light source unique ID information 911, a value of "123" is set to the guidance point ID information 912, a value of "1" is set to the boundary line flag 913, a value of "1" is set to the boundary point number information 914, a value of "6" is set to fine total boundary number information 915, information of "Park XX" is set to the "display information 1" 916, and information ("Vicinity of Crossing OO") including neighborhood information of the street light 121m is set to the "display information 2" 917.

In the data shown in FIG. 8A and FIG. 8B, a value of "0" or "1" is set to the boundary line flag 913, depending on whether the street light (lighting unit) is set up outside the special area or not. For example, the street lights 120m, 120n, 120o, 120t, 120s and 120p are provided with the lighting unit 121m, 121n, 121o, 121t, 121s and 121p respectively, and are set up outside the special area, and therefore a value of "1" is set to the boundary line flag 913 of the information. Meanwhile, the street lights 120q and 120r are provided with the lighting unit 121q and 121r, and are set up inside the special area, and therefore a value of "0" is set to the boundary line flag 913 of the information.

With respect to the lighting units, whose boundary line flags 913 have been set to "1", an order number is set to their boundary point number information 914 in accordance with a predetermined rule. In the second embodiment, for instance, the order numbers are set to the boundary point number information 914 in the clockwise direction. As shown in FIG. 7, with respect to the street lights 120m, 120n, 120o, 120t, 120s and 120p provided with the lighting unit 121m, 121n, 121o, 121t, 121s and 121p respectively, the order numbers "1", "2", . . . , and "6" are set to their boundary point number information 914 in the clockwise direction, respectively. With respect to the lighting units, whose boundary line flags 913 have been set to "0", a value of "0" or "null" code is set to their boundary point number information 914. The total boundary number information 915 indicates the total number of lighting unites, which are set up within the special area and boundary line flags 913 of which have been set to "1".

Figure 9:
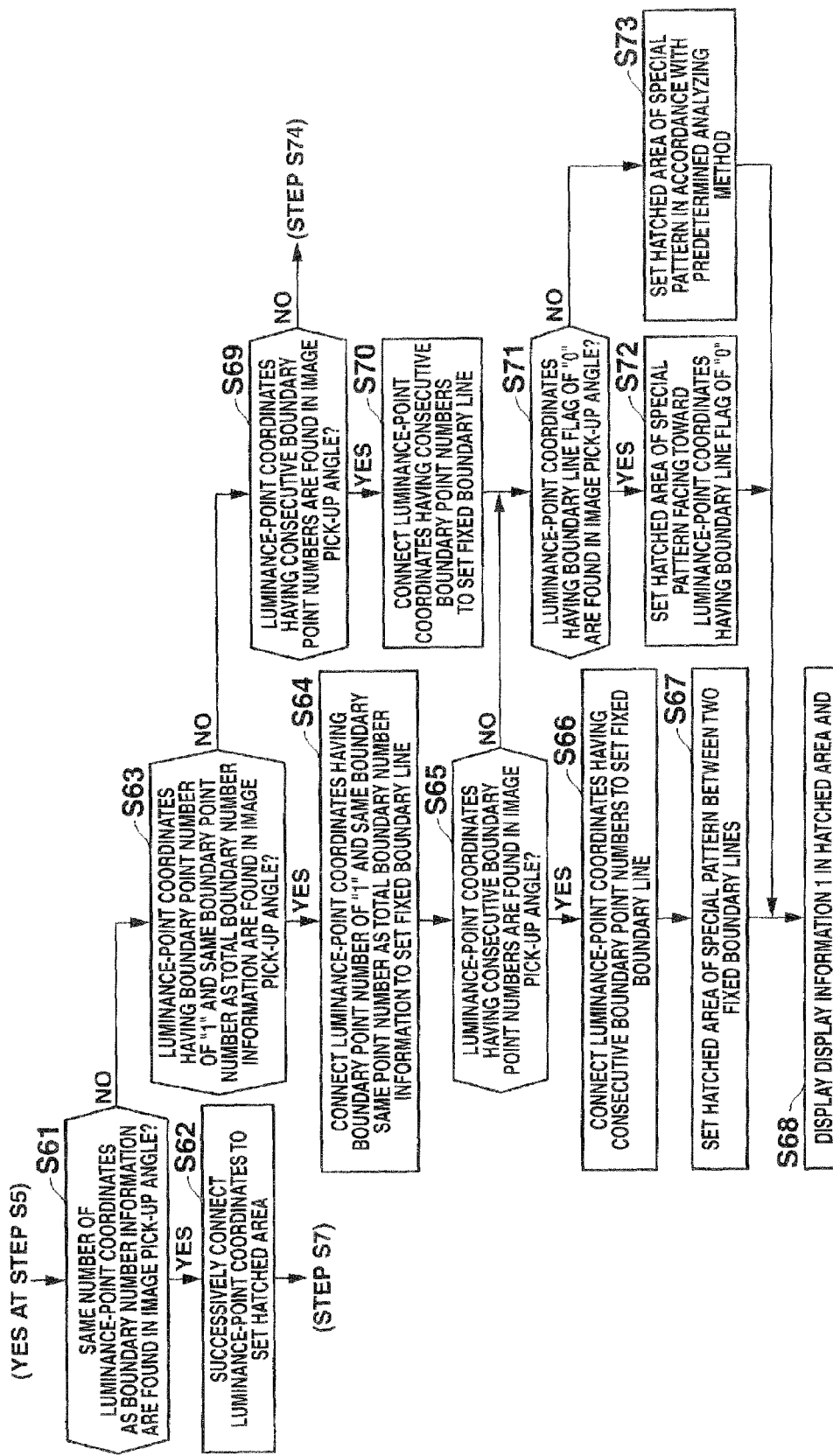
FIG. 9 is a flow chart of operation performed in the digital camera.
Figure 10:
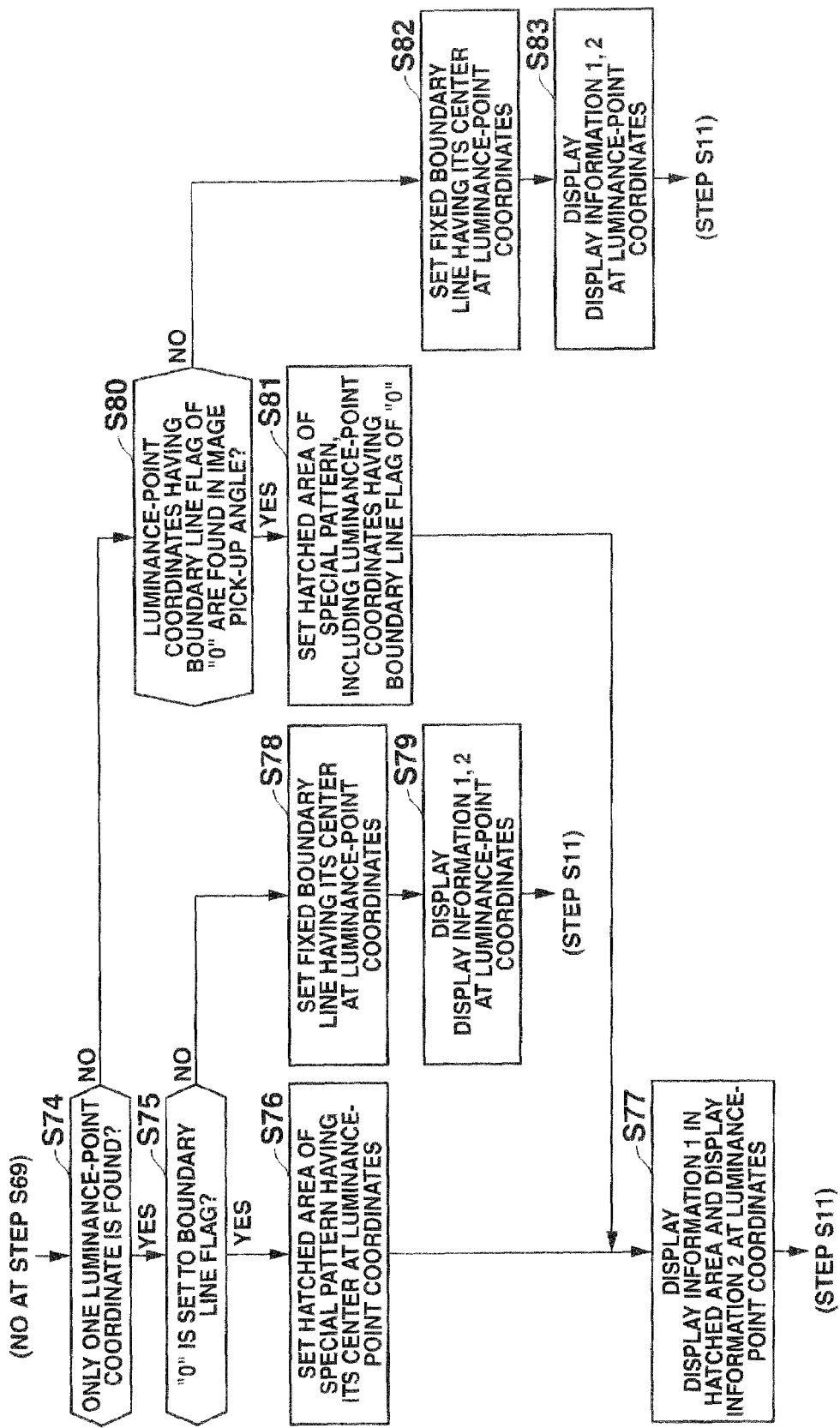
FIG. 10 is a flow chart of operation performed in the digital camera.

Now, operation of the control ling unit 806 of the digital camera 800 in the second embodiment will be described with reference to flow charts of FIGS. 9 and 10.

When it is determined at step S5 (FIG. 5) that plural luminance-point coordinates sharing the same guidance point ID information 915 have been found in the decoded information (YES at step S5 in FIG. 5), it is judges at step S61 whether or not the same number of luminance-point coordinates as the number set in the total boundary number information 915 have been found, wherein the total boundary number information 915 is included in the decoded information of the plural luminance-point coordinates. When it is determined at step S61 that the same number of luminance-point coordinates as set in the total boundary number information 915 have been found (YES at step S61), these luminance-point coordinates are successively connected to each other in the order set in the boundary point number information 914, whereby a circumscribed polygon is drawn at step S62, and operation returns to S7 (in FIG. 5).

When it is determined at step S61 that the same number of luminance-point coordinates as set in the total boundary number information 915 have not been found (NO at step S61), boundary point number information 914 in the decoded information of the plural luminance coordinates is referred to at step S63 to judge whether or not luminance-point coordinates have been found, which correspond to information including a boundary point number of "1" and a boundary point number having the same value as set in the total boundary number information 915.

When it is determined at step S63 that luminance-point coordinates have been found, which correspond to information including a boundary point number of "1" and a boundary point number having the same value as set in the total boundary number information 915 (YES at step S63), a fixed boundary line connecting these luminance-point coordinates is set at step S64. Further, the boundary point number information 914 in the decoded information of plural luminance-point coordinates is referred to again at step S65 to judge whether or not any luminance-point coordinates having consecutive boundary point numbers have been found.

When it is determined at step S65 that luminance-point coordinates having the consecutive boundary point numbers have been found (YES at step S65), the found luminance-point coordinates are connected to each other to fix a boundary line at step S66. Then, a hatched area of a special pattern is set to an area defined between the boundary line fixed at step S64 and the boundary line fixed at step S66 (step S67). These fixed boundary lines and the hatched area are displayed an the through image in an overlapping manner. Further the "information 2" 917 is displayed at each of luminance-point coordinates located at the both ends of these fixed boundary lines in the through image, and the hatched area is displayed on the through image in an overlapping manner, and further the "information 1" 916 is displayed at the center of the hatched area on the through image in an overlapping manner (step S68). Then, the operation returns to step S11.

Figure 11:
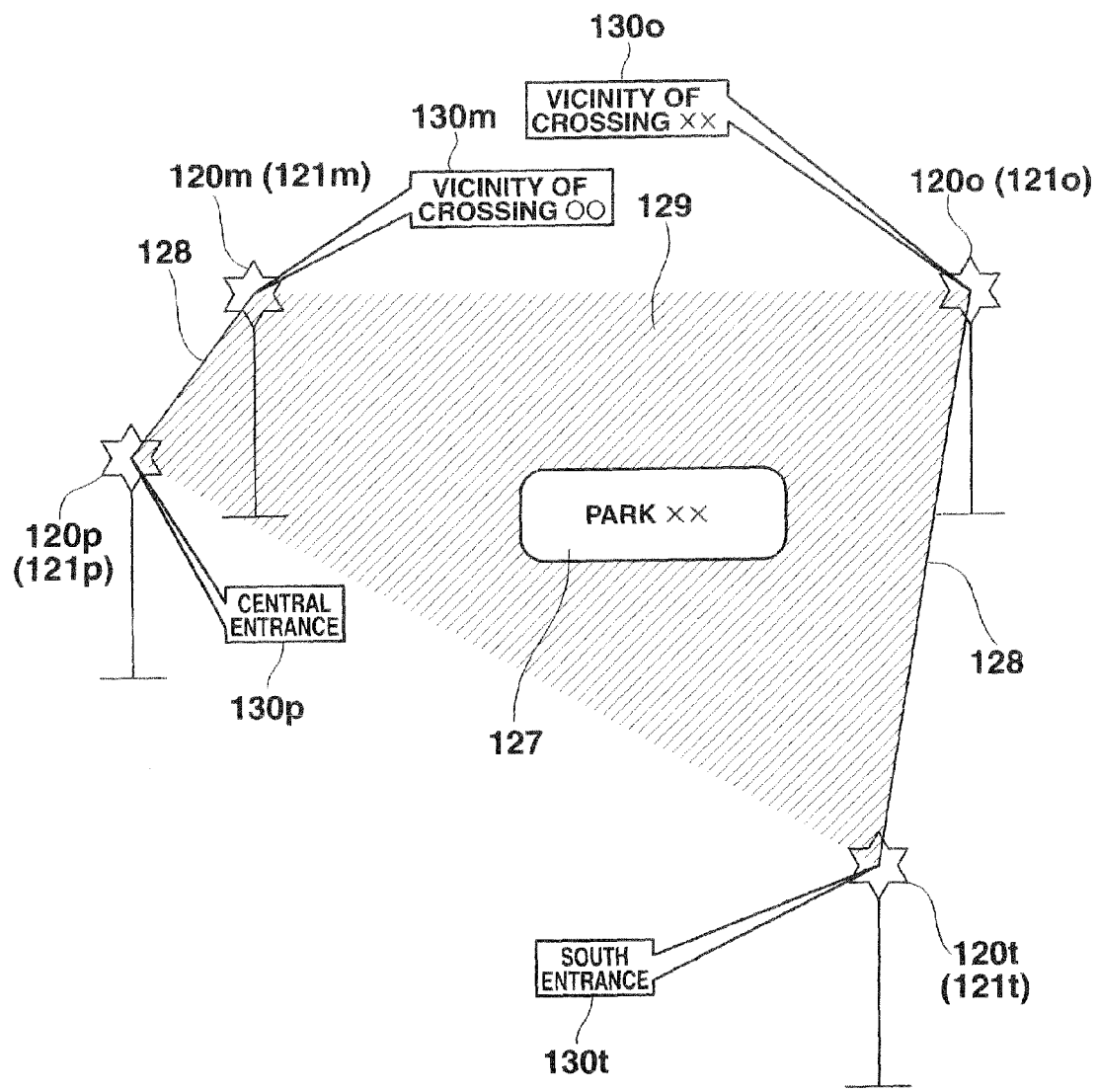
FIG. 11 is a view illustrating an image displayed on the display unit.

FIG. 11 is a view illustrating an image which is displayed on the display unit 808 at step S68. More specifically, as shown in FIG. 11, the locations of the street lights (lighting units) shown in FIG. 7 are displayed on the display unit 808, in other words, the image pick-up area (image pick-up angle) is displayed, including only the luminance-point of the lighting units 121m, 121o, 121p and 121t. As shown in FIG. 11, a fixed boundary line 128 is set between the luminance-point coordinates of the lighting unit 121m transmitting the boundary point number of "1" and the luminance-point coordinates of the lighting unit 121p transmitting the same boundary point number as that set in the total boundary number information 915, that is, "6". The lighting units transmitting information indicating the consecutive boundary point numbers are the lighting units 121o and 121t, which transmit the boundary point numbers "3" and "4" respectively. Therefore, a fixed boundary line 128 is set between the luminance-point coordinates of the lighting units 121o and 121t as shown in FIG. 11.

Further, the hatched area 129 of a special pattern is set to an area defined between these boundary lines 128, 128. At the center of the hatched area 129, consents 127 "Park XX" of the "display information 1" are displayed in an overlapping manner.

At the luminance-point coordinates of the lighting units 121m, a word balloon 130m including "display information 2" 917 of "Vicinity of Crossing OO" is displayed. At the luminance-point coordinates of the lighting units 121o, a word balloon 130o including "display information 2" 917 of "Vicinity of Crossing XX" is displayed. At the luminance-point coordinates of the lighting unit 121p is displayed a word balloon 130p including "display information 2" 917 of "Central Entrance", and at the luminance-point coordinates of the lighting unit 121t is displayed a word balloon 130t including "display information 2" 917 of "South Entrance".

As described above, even if display information is not available from all the lighting units located in the area, display information indicating an approximate space of the area, a name of the area, etc. and display information including neighborhood information of the lighting units are available for the operator.

Meanwhile, when in is determined at step S65 that luminance-point coordinates having consecutive boundary point numbers have not been found (NO at step S56), the boundary line flags 913 in the decoded information of plural luminance-point coordinates are referred to at step S71 to judged whether or not luminance-point coordinates corresponding to information, whose boundary fine flag 913 has been set to "0" are found.

When it is determined at step S71 that luminance-point coordinates corresponding to information, whose boundary line flag 913 has been set to "0" are found (YES at step S71), a hatched area 131 of a special pattern is set having a special shape (arrow-like shape) pointing luminance-point coordinates corresponding to information, whose boundary line flag 913 has been set to "0" (step S75). Plural, pieces of "display information 2" 917 are displayed at the luminance-point coordinates located at the both ends of the fixed boundary line 128 and at the luminance-point coordinates indicated by the arrow-like shape respectively on the through image in an overlapping manner. Further, "display information 1" 916 is displayed at the center of the hatched area 131 on the through image in an overlapping manner (step S68). Then, operation returns to step S11 (FIG. 5).

Figure 12:
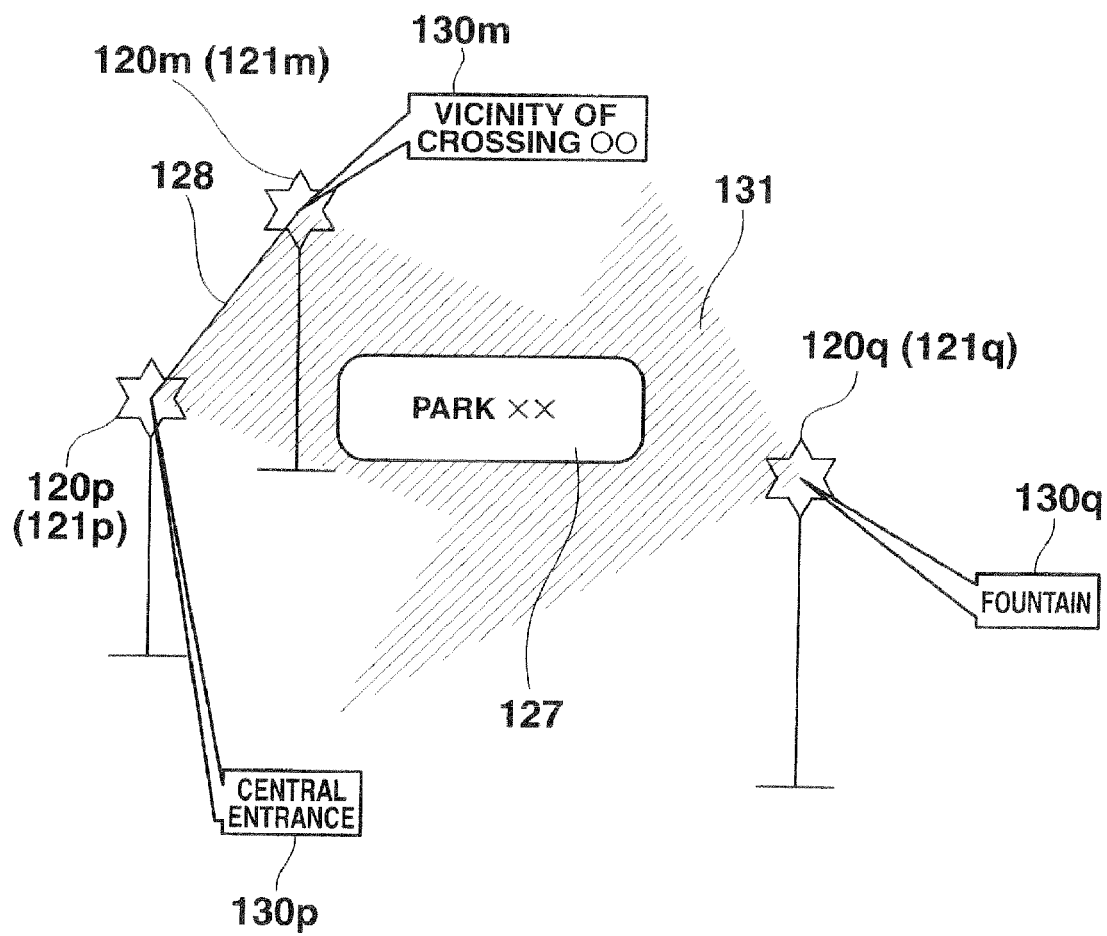
FIG. 12 is a view illustrating an image displayed on the display unit.

FIG. 12 is a view illustrating an image which is processed at step S72 and displayed on the display unit 808 at step S68.

In FIG. 12, the locations of the street lights (lighting units) shown in FIG. 7 are displayed on the display unit 808, in other words, the image pick-up area is displayed, including only the luminance-points of the lighting units 121m, 121p and 121q. As shown in FIG. 12, the fixed boundary line 128 is set, connecting two luminance-point coordinates, wherein one is the luminance-point coordinates of the lighting unit 121m transmitting the boundary point number of "1" and the other one is the luminance-point coordinates of the lighting unit 121p transmitting the same boundary point number ("6") as the number set in the total boundary number information 915.

Meanwhile, since the lighting unit 121q transmits information in which a value of "0" has been set to the boundary line flag 913, the (arrow-like) hatched area 131 of a special pattern pointing the luminance-point coordinates of the lighting unit 121q is set.

Further, at the center of the hatched area 131, the content 127 of "Park XX" of the "display information 1" 916 is displayed on the hatched area 131 in an overlapping manner. Furthermore, the lighting unit 121m with a word balloon including "display information 2" 917 of "Vicinity of Crossing OO", the lighting unit 121p with a word balloon including "display information 2" 917 of "Central Entrance", and the Lighting unit 121q with a word balloon including "display information 2" 917 of "Fountain" are displayed on the through image in an overlapping manner.

As described above, even in the ease display information is not available from all the lighting units located within the area, if information can be received from some lighting units located within the area, the operator would be able to receive display information indicating an approximate space of the area, a name of the area, etc. and display information including neighborhood information of the lighting units.

When it is determined, an step S71 that luminance-point coordinates corresponding to information, whose boundary line flag 913 has been set to "0" is not found (NO at step S71), that is, when it is determined that luminance-point coordinates corresponding to information, whose boundary line flag 913 has been set in "1" is found, a hatched area of a special pattern is set in accordance with a predetermined analyzing method at step S73. Then, the "information 2" 917 is displayed at each of luminance-point coordinates located at the both ends of the fixed boundary lines in the through image, and a hatched area is displayed on the through image in an overlapping manner, and further the "information 1" 916 is displayed at the center of the hatched area on the through image (step S68). Then, the operation returns to step S11.

The "predetermined analyzing method" performed at step S73 will be described in detail.

In the case where a fixed boundary line has been set, which connects luminance-point coordinates of a lighting unit transmitting the same boundary point number information as the number of the total boundary number information and luminance-point coordinates of a lighting unit transmitting the boundary point number information of "1", a hatched area is set to an area which is given in the right side of the line running from the luminance-point coordinates of a lighting unit transmitting the same boundary point number information as the number of the total boundary number information toward the luminance-point coordinates of a lighting unit transmitting the boundary point number information of "1".

In the case where at least two luminance-point coordinates of the lighting units are found and information of these lighting units have consecutive boundary point numbers, a hatched area is set to an area which is given in the right side of the line running from the luminance-point coordinates of the lighting unit transmitting information of a smaller boundary point number toward the luminance-point coordinates of the lighting unit transmitting information of a larger boundary point number.

As described above, even in the case display information is not available from all the lighting units located within the area, if information can be received from some lighting units located in a peripheral of the area, the operator would be able to receive display information indicating an approximate space of the area, a name of the area, etc. and display information including neighborhood information of the lighting units.

When it is determined at step S63 that luminance-point coordinates have not been found, which correspond to information including a boundary point number of "1" and a boundary point number having the same value as set in the total boundary number information 915 (NO at step S63), it is judged at step S69 substantially in the same manner as in step S64, whether or not any luminance-point coordinates corresponding to information having consecutive boundary point numbers are found.

When it is determined at step S69 that luminance-point coordinates corresponding to information having consecutive boundary point numbers are found (YES at step S69), a boundary line is set at step S70, connecting these luminance-point coordinates. Further, the boundary line flags 915 in the decoded information sent from plural luminance-point coordinates are referred to at step S71 to judge whether or not any luminance-point coordinates corresponding to information including the boundary line flag 915 of "0" are found.

When it is determined at step S71 that luminance-point coordinates corresponding to information, whose boundary line flag 913 has been set to "0" are found (YES at step S71), a hatched area 131 of a special pattern is set having a special shape (arrow-like shape) pointing luminance-point coordinates corresponding to information, whose boundary line flag 913 has been set to "0" (step S72). "Display information 2" 917 is displayed at the luminance-point coordinates located at the ends of the fixed boundary line 128 on the through image in an overlapping manner. Further, a hatched area is displayed on the through, image in an overlapping manner, and "display information 1" 916 is displayed at the center of the hatched area on the through image in an overlapping manner (step S68). Then, operation returns to step S11 (FIG. 5).

As described above, even in the case display information is not available from all the lighting units in the area, if information can be received from some lighting unit located within the area, the operator would be able to receive display information such as an approximate space of the area, a name of the area, etc. and display information of the vicinity of each lighting unit.

Meanwhile, when it is determined at step S71 that luminance-point coordinates corresponding to information, whose boundary line flag 913 has been set to "0" are not found (NO at step S71), a hatched area of a special pattern is set in accordance with the predetermined analyzing method at step S73. Then, the "information 2" 917 is displayed at each of luminance-point coordinates located at the both ends of the fixed boundary line in the through image, and the hatched area is displayed on the through image in an overlapping manner, and further the "information 1" 916 is displayed at the center of the hatched area on the through image (step S68). Then, the operation returns to step S11.

Figure 13:
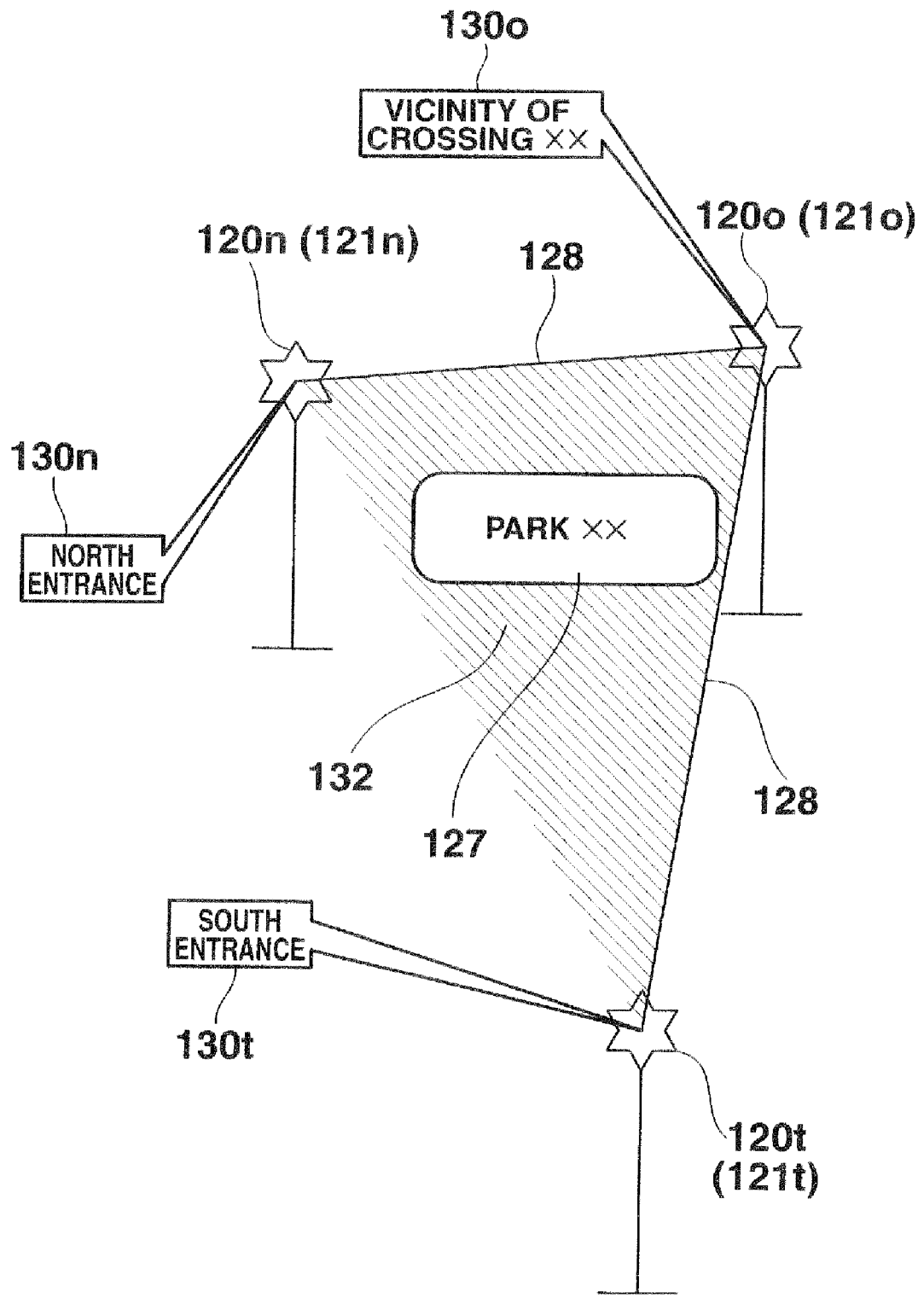
FIG. 13 is a view illustrating an image displayed on the display unit.

FIG. 13 is a view illustrating an image, which is processed, at steps S69 (YES), S70, S71 and S73, and displayed on the display unit 808 at step S68.

As shown in FIG. 13, the locations of the street lights (lighting units) shown in FIG. 7 are displayed on the display unit 808, in other words, the image pick-up area is displayed, including only the luminance-points of the lighting units 121n, 121o and 121t. As shown in FIG. 13, the fixed boundary line 128 is set, which connects two luminance-point coordinates, wherein one is the luminance-point coordinates of the lighting unit 121n transmitting the boundary point number of "2" and the other one is the luminance-point coordinates of the lighting unit 121o transmitting the boundary point number "3" following "2". Further, the fixed boundary line 128 is set, which connects two luminance-point coordinates, wherein one is the luminance-point coordinates of the lighting unit 121o transmitting the boundary point number of "3" and the other one is the luminance-point coordinates of the lighting unit 121t transmitting the boundary point number "4" following "3".

A hatched area is given in an area in the right side of the fixed, boundary lines 128, 128 running through the boundary point numbers "2", "3" and "4" and the hatched area 132 is set in a triangle having apexes at the lighting units 121n, 121o, and 121t.

At the center of the hatched area 128, content 127 of "Park. XX" of the "display information 1" is displayed in an overlapping manner. At the luminance-point coordinates of the lighting units 121n, and 121o, and 121t, a word balloon 130n including "display information 2" 917 of "North Entrance", a word balloon 130o including "display information 2" 917 of "Vicinity of Crossing XX", and a word balloon 130t including "display information 2" 917 of "South Entrance" are displayed on the through image in an overlapping manner, as shown in FIG. 13.

As described above, even in the case display information is not available from, all the lighting units located within the area, if information can be received from some lighting units located in a peripheral of the area, the operator would be able to receive display information indicating an approximate space of the area, a name of the area, etc. and display information including neighborhood information of the lighting units.

Meanwhile, when it is determined at step S69 that luminance-point coordinates corresponding to information having consecutive boundary point numbers are found (NO at step S69), it is judged at step S74 whether or not only one luminance-point coordinate has been found within the image pick-up area.

When it is determined at step S74 that only one luminance-point coordinate is found within the image pick-up area (YES at step 374), it is judged at step S75 whether or not a value of "0" has been set to the boundary line flag 913 in information transmitted from the lighting unit of the luminance-point coordinate. When it is determined at step S75 that a value of "0" has been set to the boundary line flag 913 transmitted from the lighting unit, of the luminance-point coordinate (YES at step S75), a matched area of a special, pattern, having the center at the luminance-point coordinate is set at step S76. "display information 1" 916 and "display information 2" 917 are displayed respectively at the center of the hatched area and at the luminance-point coordinates on the through image in an overlapping manner at step S77. Then, operation returns to step S11 (FIG. 5).

Figure 14A:
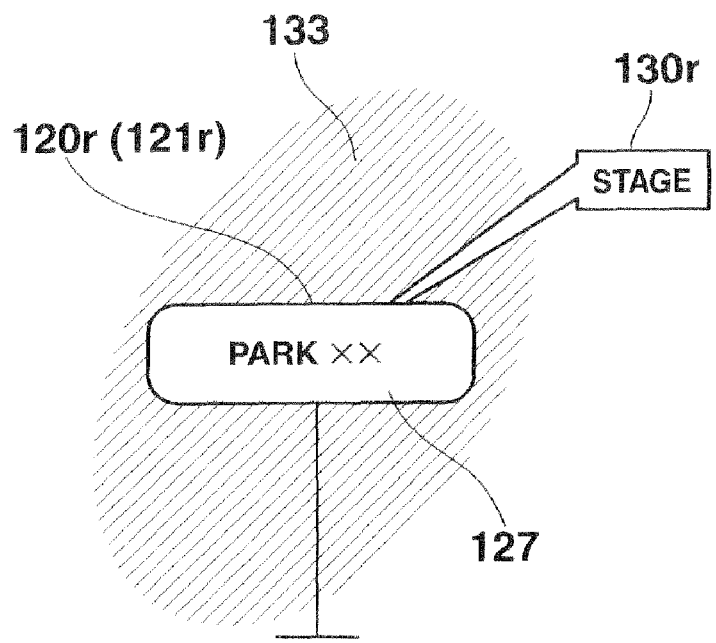
FIG. 14A is a view illustrating an image displayed on the display unit.

FIG. 14A is a view illustrating an image, which is processed and displayed on the display unit 808 at step S77.

In FIG. 14A, the location of the street light (lighting unit) shown in FIG. 7 is displayed on the display unit 808, in other words, the image pick-up area is displayed, including only the lighting unit 121r. As shown in FIG. 8B, since a value of "0" is set to the boundary line flag 913 of the lighting unit 121r, information including the boundary line flag 913 of "0" is transmitted from the lighting unit 121r and therefore the hatched area 133 of a special pattern is set with its own center at the luminance-point coordinate of the lighting unit 121r.

"Display information 1" 916 (display contents 128) of "Park XX" is displayed at the center of the hatched area on the through image in an overlapping manner. Further, a word balloon 130r including "display information 2" 917 of "Stage" is displayed at the luminance-point coordinates on the through image in an overlapping manner.

As described above, even in the case display information is not available from all the lighting units located within the area, if information can be received from one lighting unit located within the area, the operator would be able to receive not only display information indicating an approximate space of the area, a name of the area, etc. but also display information including neighborhood information of the lighting unit, in addition to information of the luminance-point coordinates.

Meanwhile, when it is determined at step S75 that a value of "0" has not been set to the boundary line flag 913, in other words when it is determined that a value of "1" has been set to the boundary line flag 913 (NO at step S75), a fixed boundary line is set with its center at the luminance-point coordinates at step S78. At the luminance-point coordinates, "display information 1" 916 and "display information 2" 917 are displayed on the through image in an overlapping manner at step A79. Then, operation returns to step S11 (FIG. 5).

Figure 14B:
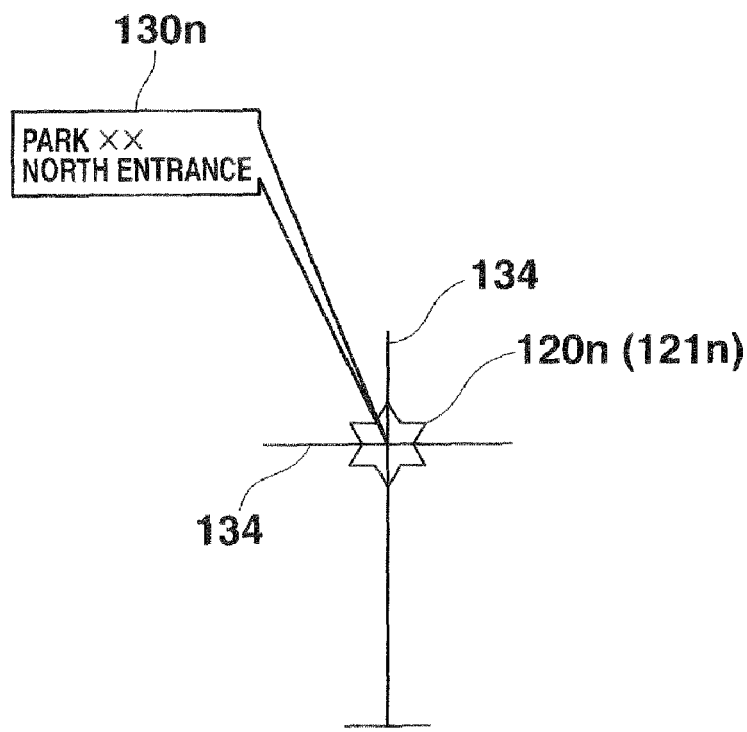
FIG. 14B is a view illustrating an image displayed on the display unit.

FIG. 14B is a view illustrating an image, which is processed and displayed on the display unit 808 at step S79.

In FIG. 14B, the location of the street light (lighting unit) shown in FIG. 7 as displayed on the display unit 808, in other words, the image pick-up area is displayed, including only the luminance-point coordinates of the lighting unit 121n. As shown in FIG. 8B, since a value of "1" is set to the boundary line flag 913 of the lighting unit 121n, information including the boundary line flag 913 of "1" is transmitted from the fighting unit 121n and therefore cross inn fixed boundary lines 134, 134 are set with their crossing point at the luminance-point coordinate of the lighting unit 121n.

At the luminance-point coordinates, the "display information 1" 916 of "Park XX" and a word balloon 130n including the "display information 2" 917 of "North Entrance" are displayed on the through image in an overlapping manner.

As described above, even in the ease display information is not available from ail the lighting units located within the area, if information can be received from some lighting unit located in a peripheral of the area, the operator would be able to receive display information indicating an approximate space of the peripheral, a name of the area, etc. and display information including neighborhood information of the lighting units.

Meanwhile, when it is determined at step S74 that plural luminance-point coordinates are found within the image pick-up area (NO at step S74), it is judged at step S80 whether or not a value of "0" has been set to the boundary line flag 913 in information transmitted from the righting units of the luminance-point coordinates. When it is determined at step S80 that a value of "0" has been set to the boundary line flag 913 (YES at step S80), a hatched area of a special pattern, including these luminance-point coordinates is set at step S81. Then, operation advances to step S77.

Figure 15:
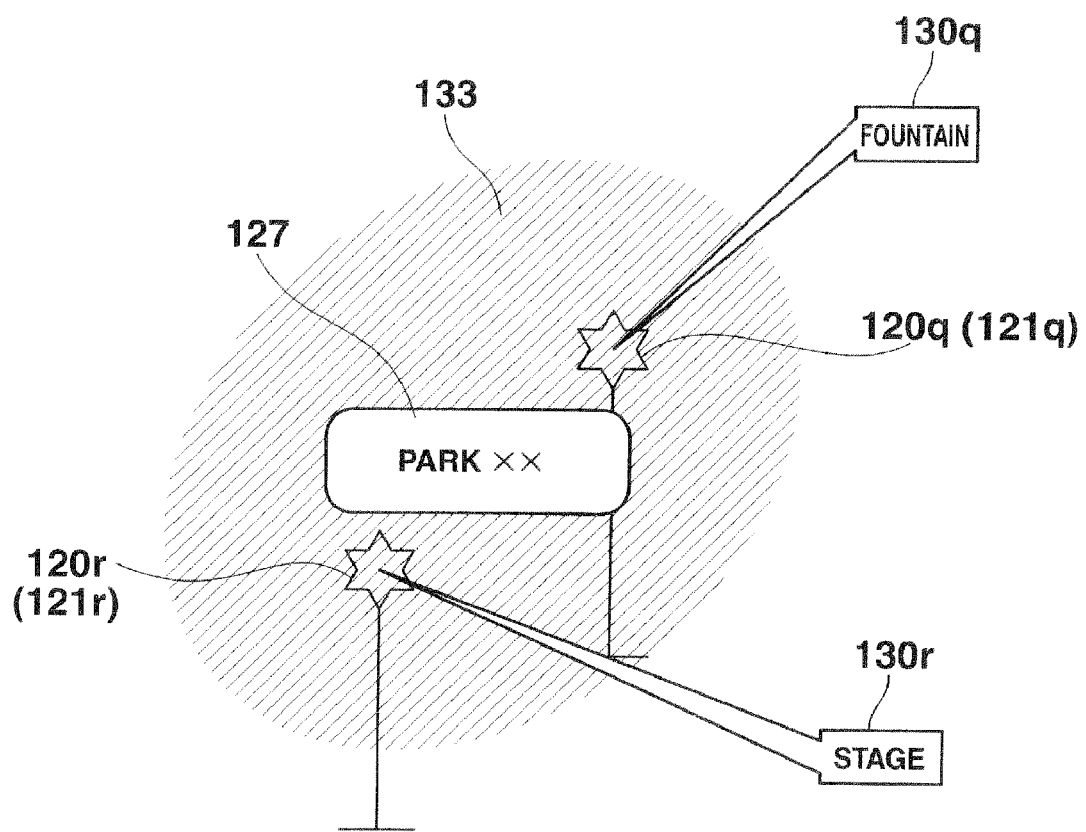
FIG. 15 is a view illustrating an image displayed on the display unit.

FIG. 15 is a view illustrating an image, which is processed at steps S81 and displayed en the display unit 808 and S77.

In FIG. 15, the locations of the street lights (lighting unit) shown in FIG. 7 are displayed on the display unit 808, in other words, the image pick-up area is displayed, including the luminance-points of the lighting units 121q and 121r. As shown in FIG. 8B, since a value of "0" is set to the boundary line flags 913 of the lighting units 121q and 121r, information including the boundary line flag 913 of "0" is transmitted from, the lighting units 121q and 121r and therefore a hatched area 133 of a special patter is set, including the luminance-points of the lighting units 121q and 121r.

"Display information 1" 916 (display contents 128) of "Park XX" is displayed at the center of the hatched area 131 on the through image in an overlapping manner. A word balloon 130q including "display information 2" 917 of "Fountain" is displayed at the luminance-point coordinates of the lighting unit 121q on the through image in an overlapping manner. Further, a word balloon 130r including "display information 2" 917 of "Stage" is displayed at the luminance-point coordinates of the lighting unit 121r on the through image in an overlapping manner.

As described above, even in the case display information is not available from all the lighting units located within the area, if information can be received from plural lighting units located within the area, the operator would be able to understand that these lighting units are not independent form each other and included in a common area, and to receive display information indicating a name of the common area and neighborhood information of lighting units.

Meanwhile, when it is determined at step S80 that a value of "0" has not been set to the boundary line flag 913, in other words when it is determined that a value of "1" has been set to the boundary line flag 913 (NO at step S80), fixed boundary lines are set with their crossing point at the luminance-point coordinates at step S82. At the luminance-point coordinates, "display information 1" 916 and "display information 2" 917 are displayed on the through image in an overlapping manner at step A83. Then, operation returns to step S11 (FIG. 5).

Figure 16:
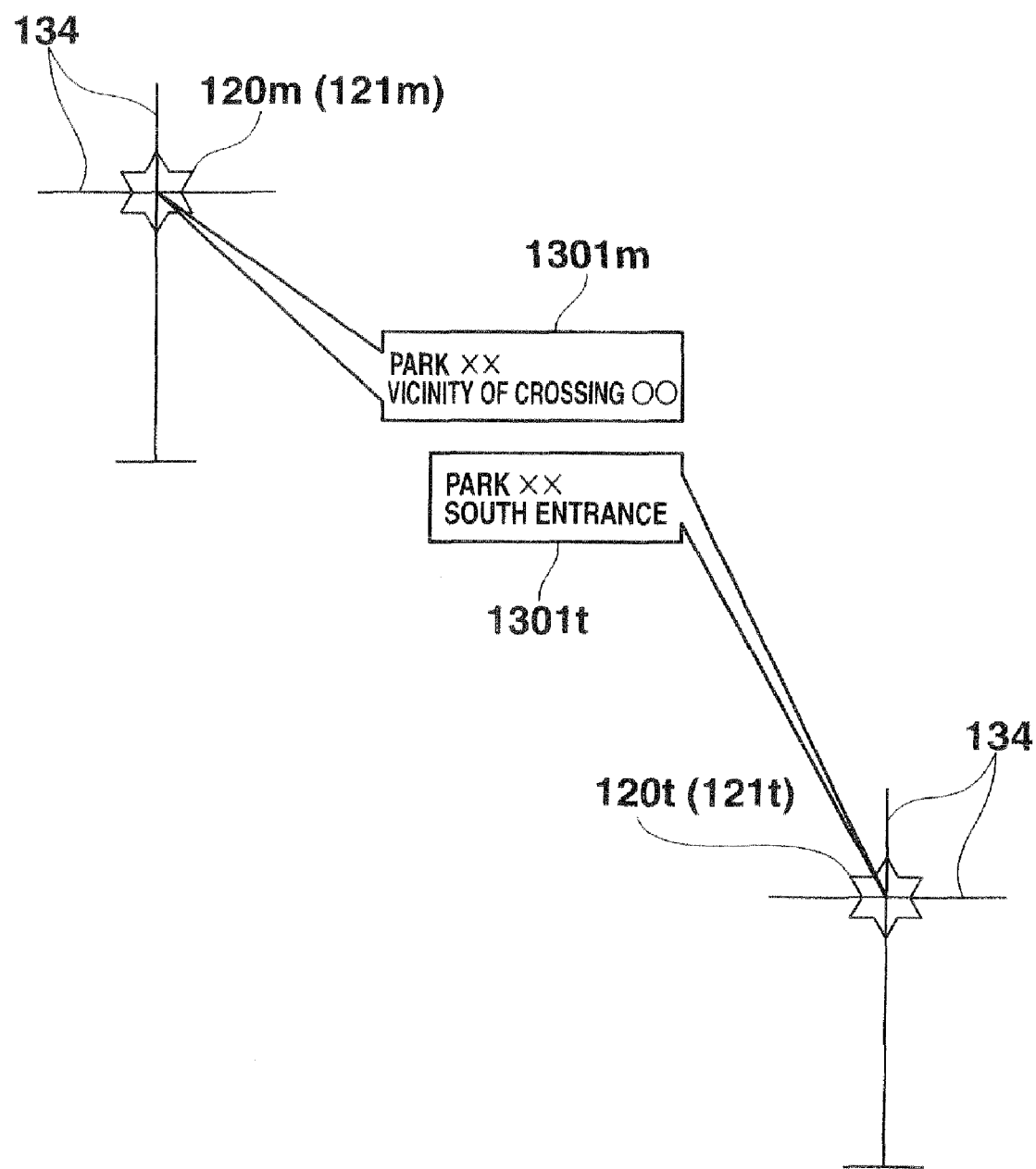
FIG. 16 is a view illustrating an image displayed on the display unit.

FIG. 16 is a view illustrating an image displayed on the display unit 808 and S83.

In FIG. 16, the locations of the street lights (lighting unit) shown in FIG. 7 are displayed on the display unit 808, in other words, the image pick-up area is displayed, including only the luminance-point coordinates of the lighting units 121m and 121t. As shown in FIG. 8B, since a value of "1" is set to the boundary line flags 913 of the lighting units 121m and 121t, information including the boundary line flag 913 of "1" is transmitted from the lighting units 121m and 121t, and therefore two set of crossing fixed boundary lines 134, 154 are set with their crossing pints respectively at the luminance-point coordinates of the lighting units 121m and 121t.

A word balloon 1301m including "display information 1" 916 of "Park XX" and "display information 2" of "Vicinity of Park XX" is displayed at the luminance-point coordinates of the lighting unit 121m in the through image in an overlapping manner. Further, a word balloon 1301t including "display information 1" 916 of "Park XX" and "display information 2" 919 of "South Entrance" is displayed at the luminance-point coordinates of the lighting unit 121t, on the through image in an overlapping manner.

As describe above, even in the case display information is not available from all the lighting units located within the area, if information can be received from some lighting units located in the peripheral of the area, fire operator would be able to understand that these lighting units are not independent from each other and included in a common area and to receive display information indicating a name of the common area, and neighborhood information of the fighting units.

In the second embodiment, even if display information is not available from all the lighting units in the area, if information can be received from some lighting units located in the peripheral of the area, the operator would be able to receive display information indicating an approximate space of the area, a expanding direction of the area, a peripheral of the lighting units, a name of the area and display information including neighborhood information of the lighting units.

In the second embodiment, it is judged depending on the value set to the boundary line flag 913 transmitted from the lighting units, whether such lighting units locate within a special area or in a peripheral of the special area. But without setting a value to the boundary line flag 913, it may be possible by judging whether or not a value of "0" (or "null") has beer, set to the boundary point number information 914 to determine whether the lighting units locate in a peripheral of a special area or within the special area.

In the above process, information volume to be transmitted from the lighting units will be reduced, whereby load of information decoding process will be also decreased.

In the present embodiment, the operation is described of processing a panoramic view of a city where lighting units (lighting equipment) for transmitting information are set up. The embodiment may be effectively used for transmitting, decoding and/or displaying of information indicating a two dimensionally expressed object, a three dimensionally expressed object and/or an object having some space.

What is claimed is:

1. An information transmitting system comprising light emitting apparatuses for modulating information into a temporal luminance change to emit light and an information decoding apparatus for continuously in time picking up an image of the light emitted from the light emitting apparatuses, thereby receiving the light, and for decoding information from the luminance change of the received light, wherein the information decoding apparatus comprises:
   a storage section which stores plural sets of (i) decoded information and (ii) a light receiving position in a field angle of the picked-up image of the light having the temporal luminance change of light, emitted from the light emitting apparatuses, wherein the decoded information and the light receiving position are associated with each other;
   a judging section which judges whether or not common information, which is common respectively to at least two light receiving positions corresponding to the light of the light emitting apparatuses, is included in plurality pieces of the decoded information stored in the storage section; and
   a displaying/outputting section which, when the judging section determines that the common information is included, displays and outputs a portion area including the at least two light receiving positions corresponding to the light of the light emitting apparatuses together with the field angle of the picked-up image in a distinguishable manner from an area including another light receiving position.

2. The information transmitting system according to claim 1, wherein the displaying/outputting section displays and outputs the common information associated with the portion area.

3. An information decoding apparatus comprising:
   an image picking-up unit;
   an information decoding section which decodes information from a temporal luminance change of light included in a field angle of an image picked up continuously in time by the image picking-up unit;
   a storing section which stores plural sets of information decoded by the information decoding section and a light receiving position in the field angle of the picked-up image of light having the temporal luminance change, wherein the decoded information and the light receiving position are associated with each other;
   a judging section which judges whether or not common information, which is common respectively to at least two light receiving positions, is included in plural pieces of the decoded information stored in the storing section; and
   a displaying/outputting section which, when the judging section determines that the common information is included, displays and outputs a portion area including the at least two light receiving positions together with the field angle of the picked-up image in a distinguishable manner from an area including another light receiving position.

4. The information decoding apparatus according to claim 3, wherein the displaying/outputting section displays and outputs the common information associated with the portion area.

5. The information decoding apparatus according to claim 3, wherein the displaying/outputting section displays the portion area with a line connecting the at least two light receiving positions, which include the common information, so as to surround the portion area.

6. The information decoding apparatus according to claim 4, wherein the displaying/outputting section displays the portion area with a line connecting the at least two light receiving positions, which include the common information, so as to surround the portion area.

7. An informing method comprising:
   picking up an image continuously in time by an image picking-up unit, thereby receiving light and decoding information from a luminance change of the received light;
   storing in a storing unit plural sets of the decoded information and a light receiving position in a field angle of the image of the light having the temporal luminance change, picked-up by the image picking-up unit, wherein the decoded information and the light receiving position are associated with each other;
   judging whether or not common information, which is common respectively to at least two light receiving positions, is included in plural pieces of the decoded information stored in the storing unit; and
   displaying and outputting a portion area including the at least two light receiving positions together with the field angle of the picked-up image in a distinguishable manner from an area including another light receiving position, when it is judged that the common information is included.

8. A non-transitory computer-readable storage medium having a program stored thereon for controlling a computer of an information decoding apparatus, wherein the information decoding apparatus is provided with an image picking-up unit and picks up an image continuously in time by using the image picking-up unit, thereby receiving light, and decodes information from a luminance change of the received light, wherein the program controls the computer to function as elements including:

a storage controlling section which stores in a storing unit plural sets of the decoded information and a light receiving position in a field angle of the picked-up image of the light having the temporal luminance change, wherein the light receiving position and the decoded information are associated with each other;

a judging section which judges whether or not common information, which is common respectively to at least two light receiving positions is included in plurality pieces of the decoded information stored in the storing section; and a displaying/outputting section which, when the judging section determines that the common information is included, displays and outputs a portion area including the at least two light receiving positions together with the field angle of the picked-up image in a distinguishable manner from an area including another light receiving position.

* * * * *